US009467216B2

(12) United States Patent
Lee et al.

(10) Patent No.: US 9,467,216 B2
(45) Date of Patent: Oct. 11, 2016

(54) COMPUTING SYSTEM WITH JOINT-TRANSMISSION MECHANISM AND METHOD OF OPERATION THEREOF

(71) Applicant: Samsung Electronics Co., Ltd., Suwon-si, Gyeonggi-Do (KR)

(72) Inventors: Jungwon Lee, San Diego, CA (US); Jung Hyun Bae, San Diego, CA (US); Inyup Kang, San Diego, CA (US)

(73) Assignee: Samsung Electronics Co., Ltd., Gyeonggi-Do (KR)

( * ) Notice: Subject to any disclaimer, the term of this patent is extended or adjusted under 35 U.S.C. 154(b) by 0 days.

(21) Appl. No.: 14/502,195

(22) Filed: Sep. 30, 2014

(65) Prior Publication Data

US 2015/0030096 A1    Jan. 29, 2015

Related U.S. Application Data

(63) Continuation-in-part of application No. 13/893,819, filed on May 14, 2013.

(60) Provisional application No. 61/939,606, filed on Feb. 13, 2014, provisional application No. 61/659,904, filed on Jun. 14, 2012.

(51) Int. Cl.
*H04B 7/04*     (2006.01)
*H04L 5/00*     (2006.01)

(52) U.S. Cl.
CPC .............. *H04B 7/0486* (2013.01); *H04L 5/00* (2013.01)

(58) Field of Classification Search
CPC ... H04L 1/0038; H04B 7/024; H04B 7/0456; H04B 7/0452; H04W 72/042; H04W 72/04
See application file for complete search history.

(56) References Cited

U.S. PATENT DOCUMENTS 8,406,171 B2    3/2013  Onggosanusi et al.
8,588,801 B2    11/2013 Gorokhov et al.
(Continued)

OTHER PUBLICATIONS

H. Yanikomeroglu and F.Yu, "Coordinated Multi-Point (CoMP) Adaptive Estimation and Prediction Schemes using Superimposed and Decomposed Channel Tracking", IEEE International Conference on Communication Workshops (ICC), pp. 116-121, 2013.
(Continued)

*Primary Examiner* — Daniel Washburn
*Assistant Examiner* — Eboni Hughes
(74) *Attorney, Agent, or Firm* — IP Investment Law Group

(57) ABSTRACT

A computing system includes: a communication unit configured to: identify an overall communication content or a portion therein for blind-joint transmission with a second device for utilizing the second device and a third device to send the overall communication content to a first device, generate a first encoded set corresponding to the overall communication content or the portion therein for communicating the overall communication content along with a second encoded set for the third device, determine a first pre-coding mechanism associated with the first encoded set for communicating the overall communication content with overload transmission mode including a second pre-coding mechanism for the third device; and an inter-device interface, coupled to the communication unit, configured to communicate a first transmitter signal based on the first encoded set and the first pre-coding mechanism for communicating the first transmitter signal concurrently with a second transmitter signal from the third device.

20 Claims, 7 Drawing Sheets

(56) References Cited

U.S. PATENT DOCUMENTS

| | | | |
|---|---|---|---|
| 8,594,688 B2 | 11/2013 | Barbieri et al. | |
| 8,874,151 B2* | 10/2014 | Ogawa | H04B 7/024 455/101 |
| 2009/0003475 A1* | 1/2009 | Erceg | H04B 7/0417 375/260 |
| 2010/0035600 A1* | 2/2010 | Hou | H04B 7/024 455/422.1 |
| 2010/0074183 A1 | 3/2010 | Chen et al. | |
| 2010/0172430 A1* | 7/2010 | Melzer | H04B 7/0417 375/267 |
| 2010/0273492 A1* | 10/2010 | Liu | H04B 7/022 455/446 |
| 2010/0322351 A1* | 12/2010 | Tang | H04B 7/024 375/31 |
| 2011/0255572 A1* | 10/2011 | Giannakis | H04L 25/0206 375/146 |
| 2012/0026940 A1 | 2/2012 | Barbieri et al. | |
| 2012/0028628 A1* | 2/2012 | Frenger | H04B 7/0417 455/422.1 |
| 2012/0063383 A1 | 3/2012 | Barbieri et al. | |
| 2012/0281573 A1 | 11/2012 | Kazmi et al. | |
| 2012/0282964 A1 | 11/2012 | Xiao et al. | |
| 2013/0094604 A1* | 4/2013 | Mondal | H04B 7/024 375/295 |
| 2013/0258886 A1 | 10/2013 | Chen et al. | |
| 2013/0272250 A1* | 10/2013 | Shimezawa | H04B 7/063 370/329 |
| 2013/0273931 A1* | 10/2013 | Lunttila | H04W 72/085 455/452.2 |
| 2013/0294275 A1 | 11/2013 | Gorokhov et al. | |
| 2013/0315189 A1* | 11/2013 | Kim | H04L 1/0026 370/329 |
| 2014/0044061 A1 | 2/2014 | Yue et al. | |
| 2014/0045510 A1 | 2/2014 | Yue et al. | |
| 2014/0078919 A1 | 3/2014 | Hammarwall | |
| 2014/0112234 A1 | 4/2014 | Wei | |
| 2014/0348075 A1* | 11/2014 | Kim | H04B 7/0626 370/329 |

OTHER PUBLICATIONS

D.Lee, H.Seo, B.Clerckx, E.Hardouin, D.Mazzarese, S.Nagata, and K.Sanyana, "Coordinated Multipoint Transmission and Reception in LTE—Advanced: Deployment Scenarios and Operational Challenges", IEEE Communications Magazine, vol. 50, Iss. 2, pp. 148-155, 2012.

S.Schwarz, "Coordinated Multi-Point (CoMP) in LTE", Vienna University of Technology, Institute of Telecommunications, Mar. 27, 2014.

M.Zoltan, "Optimizing Coordinated Multi-Point Transmission under Unreliable Backhaul", Chalmers University of Technology, Master's Thesis in Communication Engineering, EX001/2013, 2013.

* cited by examiner

US 9,467,216 B2

COMPUTING SYSTEM WITH JOINT-TRANSMISSION MECHANISM AND METHOD OF OPERATION THEREOF

CROSS-REFERENCE TO RELATED APPLICATION(S)

This application claims the benefit of U.S. Provisional Patent Application Ser. No. 61/939,606 filed Feb. 13, 2014, and the subject matter thereof is incorporated herein by reference thereto. This is a continuation-in-part of co-pending U.S. patent application Ser. No. 13/893,819, filed May 14, 2013, which claims the benefit of U.S. Provisional Patent Application Ser. No. 61/659,904 filed Jun. 14, 2012, and the subject matter thereof is incorporated herein by reference thereto

TECHNICAL FIELD

Embodiments described herein relates generally to a computing system, and more particularly to a system with joint-transmission mechanism.

BACKGROUND

Modern consumer and industrial electronics, especially devices such as cellular phones, navigations systems, portable digital assistants, and combination devices, are providing increasing levels of functionality to support modern life including mobile communication. Research and development in the existing technologies can take a myriad of different directions.

The increasing demand for information in modern life requires users to access information at any time, at increasing data rates. However, telecommunication signals used in mobile communication effectively experience various types of interferences from numerous sources, as well as computational complexities rising from numerous possible formats for communicated information, which affect the quality and speed of the accessible data.

Thus, a need still remains for a computing system with joint-transmission mechanism. In view of the ever-increasing commercial competitive pressures, along with growing consumer expectations and the diminishing opportunities for meaningful product differentiation in the marketplace, solutions to these issues are desirable. Additionally, the need to reduce costs, improve efficiencies and performance, and meet competitive pressures adds an even greater urgency to finding answers to these problems.

Solutions to these problems have been long sought but prior developments have not taught or suggested any solutions and, thus, solutions to these problems have long eluded those skilled in the art.

SUMMARY

An embodiment provides a computing system, including: a communication unit configured to: identify an overall communication content or a portion therein for blind-joint transmission with a second device for utilizing the second device and a third device to send the overall communication content to a first device, generate a first encoded set corresponding to the overall communication content or the portion therein for communicating the overall communication content along with a second encoded set for the third device, determine a first pre-coding mechanism associated with the first encoded set for communicating the overall communication content with overload transmission mode including a second pre-coding mechanism for the third device; and an inter-device interface, coupled to the communication unit, configured to communicate a first transmitter signal based on the first encoded set and the first pre-coding mechanism for communicating the first transmitter signal concurrently with a second transmitter signal from the third device.

An embodiment provides a method of operation of a computing system including: identifying an overall communication content or a portion therein for blind-joint transmission with a second device for utilizing the second device and a third device to send the overall communication content to a first device; generating a first encoded set corresponding to the overall communication content or the portion therein for communicating the overall communication content along with a second encoded set for the third device; determining with a communication unit a first pre-coding mechanism associated with the first encoded set for communicating the overall communication content with overload transmission mode including a second pre-coding mechanism for the third device; and communicating a first transmitter signal based on the first encoded set and the first pre-coding mechanism for communicating the first transmitter signal concurrently with a second transmitter signal from the third device.

An embodiment provides a non-transitory computer readable medium including instructions for operating a computing system including: identifying an overall communication content or a portion therein for blind-joint transmission with a second device for utilizing the second device and a third device to send the overall communication content to a first device; generating a first encoded set corresponding to the overall communication content or the portion therein for communicating the overall communication content along with a second encoded set for the third device; determining a first pre-coding mechanism associated with the first encoded set for communicating the overall communication content with overload transmission mode including a second pre-coding mechanism for the third device; and communicating a first transmitter signal based on the first encoded set and the first pre-coding mechanism for communicating the first transmitter signal concurrently with a second transmitter signal from the third device.

Certain embodiments have other steps or elements in addition to or in place of those mentioned above. The steps or elements will become apparent to those skilled in the art from a reading of the following detailed description when taken with reference to the accompanying drawings.

DETAILED DESCRIPTION

Figure 1:
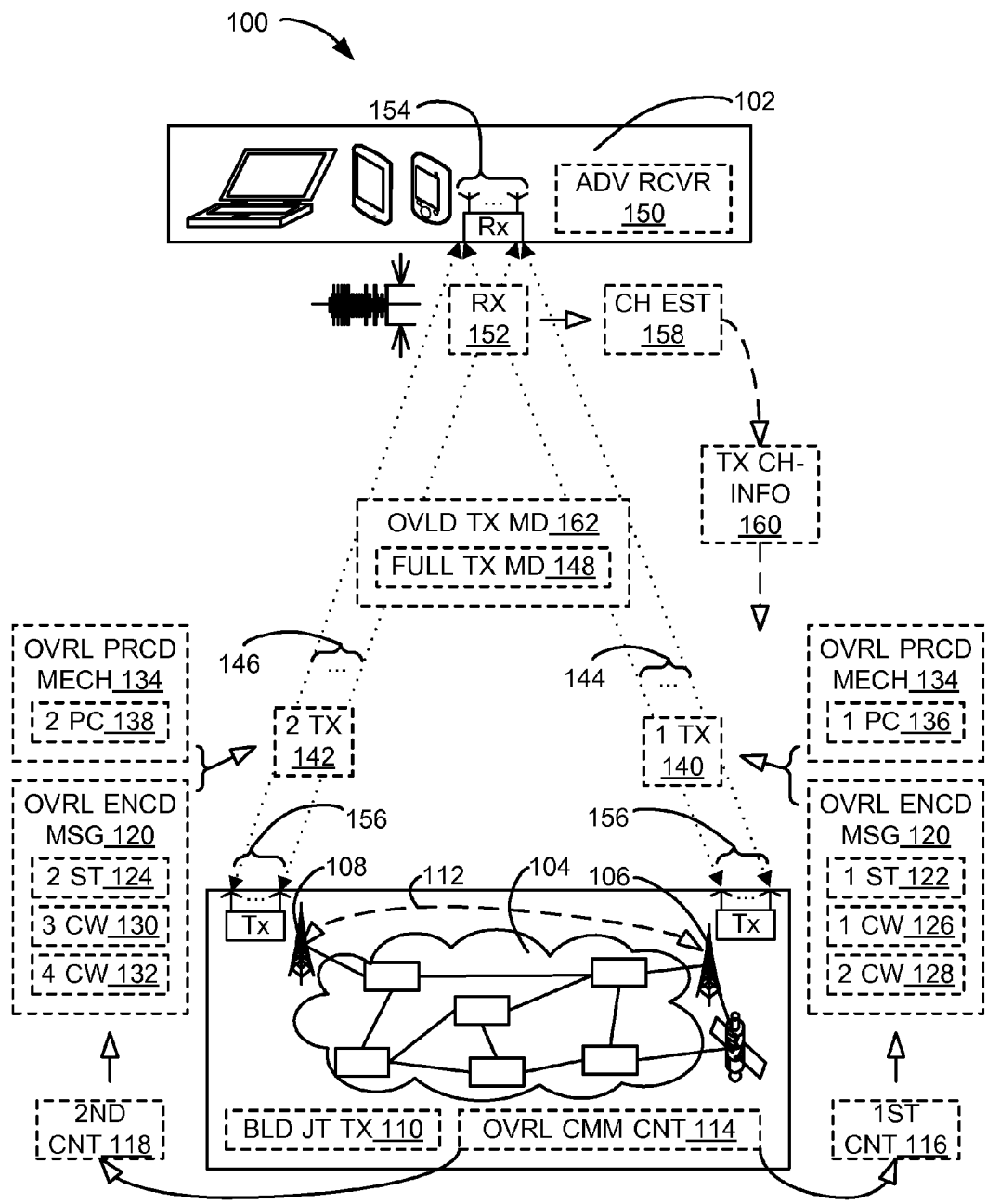
FIG. 1 is a computing system with joint-transmission mechanism in an embodiment.

The following embodiments can be used to implement blind-joint transmission for utilizing multiple transmitters to transmit to a receiving device. The blind-joint transmission can be implemented using first pre-coding mechanism and second pre-coding mechanism including overall pre-coding mechanism or unique and non-overlapping portions therein based on a rotating pattern and without transmitter channel-information. The blind-joint transmission can further utilize an advanced receiver at the receiving device.

The blind-joint transmission can transmit overall communication content using the multiple transmitting devices regardless of receiver capacity. The blind-joint transmission can communicate using overload transmission mode, including full-rank transmission mode.

The following embodiments are described in sufficient detail to enable those skilled in the art to make and use the described embodiments. It is to be understood that other embodiments would be evident based on the present disclosure, and that system, process, or mechanical changes may be made without departing from the scope of an embodiment.

In the following description, numerous specific details are given to provide a thorough understanding of the described embodiments. However, it will be apparent that the described embodiments may be practiced without these specific details. In order to avoid obscuring an embodiment, some well-known circuits, system configurations, and process steps are not disclosed in detail.

The drawings showing embodiments of the system are semi-diagrammatic, and not to scale and, particularly, some of the dimensions are for the clarity of presentation and are shown exaggerated in the drawing figures. Similarly, although the views in the drawings for ease of description generally show similar orientations, this depiction in the figures is arbitrary for the most part. Generally, the described embodiments can be operated in any orientation. The embodiments have been numbered first embodiment, second embodiment, etc. as a matter of descriptive convenience and are not intended to have any other significance or provide limitations for an embodiment.

The term "module" referred to herein can include or be implemented as software, hardware, or a combination thereof in accordance with the context in which the term is used. For example, the software can be machine code, firmware, embedded code, and application software. The software can also include a function, a call to a function, a code block, or a combination thereof. Also for example, the hardware can be gates, circuitry, processor, computer, integrated circuit, integrated circuit cores, a pressure sensor, an inertial sensor, a microelectromechanical system (MEMS), passive devices, physical non-transitory memory medium having instructions for performing the software function, a portion therein, or a combination thereof.

The term "processing" as used herein includes manipulating signal and corresponding data, such as filtering, detecting, decoding, assembling data structures, transferring data structures, manipulating data structures, and reading and writing data structures. Data structures are defined to be information arranged as symbols, packets, blocks, files, input data, system generated data, such as calculated or generated data, and program data.

Referring now to FIG. 1, therein is shown a computing system 100 with joint-transmission mechanism. The computing system 100 includes a first device 102, such as a mobile device including a cellular phone or a notebook computer, connected to a network 104. The first device 102 can further include a wired device, such as a modem or a router. The first device 102 can further include a circuit or a device within a comprehensive device, such as a portion or circuit specializing in processing information within a storage device or system. The first device 102 can include a user equipment (UE).

The network 104 is a system of wired or wireless communication devices or means that are connected to each other for enabling communication between devices. For example, the network 104 can include a combination of wires, transmitters, receivers, antennas, towers, stations, repeaters, telephone network, servers, or client devices for a wireless cellular network. The network 104 can also include a combination of routers, cables, computers, servers, and client devices for various sized area networks. Also for example, the network 104 can include a communication bus, a wire, a cable, a wireless connection, or a combination thereof between units within a device.

The computing system 100 can include a second device 106, a third device 108, or a combination thereof for directly or indirectly linking and communicating with the first device 102. The network 104 can include or couple to the second device 106, the third device 108, or a combination thereof. The second device 106, the third device 108, or a combination thereof can receive wireless signals from the first device 102, transmit signals to the first device 102, process signals, or a combination thereof. The second device 106, the third device 108, or a combination thereof can also relay signals between other base stations, components within the network 104, or a combination thereof.

The first device 102 can be connected to the network 104 through the second device 106, the third device 108, or a combination thereof. For example, the second device 106, the third device 108, or a combination thereof can be a coordinating device or a controlling device for communication in the computing system 100, a base station, an evolved node B (eNodeB), a server, a router, a modem, or a combination thereof. As a more specific example, the second device 106, the third device 108, or a combination thereof can include the coordinating device or the controlling device controlling, managing, or scheduling functions, actions, tasks, or a combination thereof for various devices within the computing system 100.

Also for example, the second device 106, the third device 108, or a combination thereof can be a communication device or a processing component included or with a cell tower, a wireless router, an antenna, or a combination thereof being used to communicate with, such as by sending signals to or receiving signals from, the first device 102 including a mobile computing device. Also for example, the second device 106, the third device 108, or a combination thereof can include a portion or circuit specializing in storing information within the storage device or system.

The first device 102 can connect to and communicate with other devices, such as other mobile devices, servers, computers, telephones, or a combination thereof. For example, the first device 102 can communicate with other devices by transmitting signals, receiving signals, processing signals, or a combination thereof and displaying content of the signals, audibly recreating sounds according to the content of the signals, processing according to the content, such as storing an application or updating an operating system, or a combination thereof.

The second device 106 can be used to wirelessly exchange signals for communication, including voice signals of a telephone call or data representing a webpage and interactions therewith. The second device 106 can also transmit reference signals, training signals, error detection signals, error correction signals, header information, transmission format, protocol information, or a combination thereof.

Based on the communication method, such as code division multiple access (CDMA), orthogonal frequency-division multiple access (OFDMA), Third Generation Partnership Project (3GPP), Long Term Evolution (LTE), or fourth generation (4G) standards, the communication signals can include a reference portion, a header portion, a format portion, an error correction or detection portion, or a combination thereof imbedded in the communicated information. The reference portion, header portion, format portion, error correction or detection portion, or a combination thereof can include a predetermined bit, pulse, wave, symbol, or a combination thereof. The various portions can be embedded within the communicated signals at regular time intervals, frequency, code, or a combination thereof.

For illustrative purposes, the computing system 100 will be described as a communication system with the first device 102 as a user equipment, such as a mobile device, and the second device 106 as a base station or the coordinating device. However, it is understood that the computing system 100 can be different, such as a memory system with the first device 102 as a processing portion in a disc drive or a device focusing on processing in a memory system, and the second device 106 as a storage portion in the disc drive or a device focusing on storing in the memory system.

The computing system 100 can further include a node link 112. The node link 112 can include a method, a process, or a mechanism for directly communicating information between node devices or access points.

For example, the node link 112 can include the coordinating device for managing the second device 106, the third device 108, or a combination thereof. Also for example, the node link 112 can include a wired or wireless communication channel or connection, exchanged information, a communication protocol, a method or a process for further processing the exchanged information, or a combination thereof between the second device 106 and the third device 108. As a more specific example, the node link 112 can include a back-haul channel for communicating between base stations The computing system 100 can utilize blind-joint transmission 110 for communicating information between devices. The blind-joint transmission 110 is a format or a mode for communication utilizing multiple sources to send information to a single receiving device without utilizing global information regarding channels. The computing system 100 can use the node link 112 to coordinate or control the blind-joint transmission 110 with multiple transmitting devices, such as the second device 106 and the third device 108.

For example, the computing system 100 can use the second device 106, the third device 108, additional instance of the base station or the coordinating device, or a combination thereof to send overall communication content 114 to the first device 102 for the blind-joint transmission 110. The overall communication content 114 can include information intended for communication to a receiving device, such as for reproduction or execution at the receiving device.

Continuing with the example, the computing system 100 can distribute the overall communication content 114 using the coordinating device, such as the second device 106 or the third device 108, to multiple transmitting devices, such as the second device 106, the third device 108, other instance of the UE, or a combination thereof. As a more specific example, the computing system 100 can determine applicable transmitters corresponding to the first device 102 and distribute the overall communication content 114 to each instance of the applicable transmitters.

Also as a more specific example, the computing system 100 can distribute non-overlapping or unique portions of the overall communication content 114 to the each instance of the applicable transmitters corresponding to the first device 102. As a further specific example, the computing system 100 can distribute first transmission content 116 including the overall communication content 114 in entirety or a portion therein to the second device 106, distribute second transmission content 118 including the overall communication content 114 in entirety or a different portion therein to the third device 108, or a combination thereof. The first transmission content 116 and the second transmission content 118 can each include non-overlapping or unique portions of the overall communication content 114.

Continuing with the example, the computing system 100 can use multiple instances of the transmitting device to communicate the overall communication content 114 to the first device 102 for the blind joint transmission 110. As a more specific example, the computing system 100 can use the second device 106 and the third device 108 to each simultaneously transmit unique portions of the overall communication content 114 to the first device 102.

The computing system 100 can encode the content for transmitting the content. The computing system 100 can encode the content by encoding the overall communication content 114. The computing system 100 can encode the overall communication content 114 for enabling error correction process, error detection process, or a combination thereof for communicating information between devices.

The computing system 100 can generate overall encoded message 120 by encoding the overall communication content 114. The overall encoded message 120 can include the overall communication content 114 encoded according to a coding mechanism, such as a polar coding scheme or a turbo coding scheme.

The computing system 100 can generate the overall encoded message 120 in various ways. For example, the computing system 100 can use one or more of the transmitting devices to each generate the overall encoded message 120. Also for example, the computing system 100 can generate the overall encoded message 120 across multiple devices.

As a more specific example, the first device 102, the second device 106, the third device 108, or a combination thereof sending the overall encoded message 120 or a portion therein can each generate the overall encoded message 120 corresponding to the first transmission content 116 and the second transmission content 118 each including the overall communication content 114. Also as a more specific example, the second device 106, the third device 108, or a combination thereof can each encode the first transmission content 116 or the second transmission content 118, each including the non-overlapping unique portions within the overall communication content 114.

The second device 106, the third device 108, or a combination thereof can generate first encoded set 122 by encoding the first transmission content 116, generate second encoded set 124 by encoding the second transmission content 118, or a combination thereof. The first encoded set 122 and the second encoded set 124 can include information to be transmitted concurrently using multiple devices, multiple antennas, or a combination thereof.

The first transmission content 116, the second transmission content 118, or a combination thereof can correspond to the overall encoded message 120. The overall encoded message 120 can include the first transmission content 116, the second transmission content 118, or a combination thereof.

As a specific illustrative example, the overall encoded message 120 can include a first code word 126, a second code word 128, a third code word 130, and a fourth code word 132. The first code word 126, the second code word 128, the third code word 130, and the fourth code word 132 can each include an element or a unit of a standardized code or protocol.

Continuing with the example, the first code word 126, the second code word 128, the third code word 130, and the fourth code word 132 can each include a unique instance of the element or the unit of information included in the overall encoded message 120. The first encoded set 122 and the second encoded set 124 can include the first code word 126, the second code word 128, the third code word 130, the fourth code word 132, or a combination thereof.

As a further specific example, the second device 106 can generate the first code word 126, the second code word 128, the third code word 130, the fourth code word 132, or a combination thereof corresponding to encoding the overall communication content 114, or the first transmission content 116 or the second transmission content 118 therein. Also as a further specific example, the third device 108 can generate the first code word 126, the second code word 128, the third code word 130, the fourth code word 132, or a combination thereof corresponding to encoding the overall communication content 114, or the first transmission content 116 or the second transmission content 118 therein.

For illustrative purposes, the computing system 100 will be described with the second device 106 and the third device 108 each generating the overall encoded message 120, or with the second device 106 generating the first code word 126 and the second encoded word 128 corresponding to the first encoded set 122 and the third device 108 generating the third code word 130 and the fourth code word 132 corresponding to the second encoded set 124. However, it is understood that the encoding of the content can be distributed across devices in various ways.

For example, the second device 106 can generate the second encoded set 124 and the third device 108 can generate the first encoded set 122. Also for example, the second device 106 and the third device 108 can generate any combination of the first code word 126, the second code word 128, the third code word 130, or the fourth code word 132.

The computing system 100 can further process the encoding results for processing. For example, the computing system 100 can generate symbols corresponding to the overall communication content 114 or portions therein. The computing system 100 can generate symbols according to a constellation or a modulation scheme, such as quadrature amplitude modulation (QAM), phase shift keying (PSK), or a derivation thereof.

Also for example, the computing system 100 can utilize a precoding process in sending the content. The computing system 100 can utilize the precoding process to exploit transmit diversity for multiple sources, antennas, or a combination thereof transmitting to an intended receiver.

The computing system 100 can utilize the precoding process corresponding to or associated with a source, an antenna, transmitted data, channel information, or a combination thereof. The computing system 100 can utilize the precoding process with an overall pre-coding mechanism 134. The overall pre-coding mechanism 134 can be a factor, a control parameter, a process or a method associated thereto, an assignment, a sequence, or a combination thereof for exploiting transmit-diversity for communicating the overall communication content 114.

For example, the overall pre-coding mechanism 134 can include a precoding matrix. The overall pre-coding mechanism 134 can include assignments, timing, sequence, or a combination thereof for specific instance of units or portions within the overall communication content 114. As a more specific example, the overall pre-coding mechanism 134 can include assignment of the first code word 126, the second code word 128, the third code word 130, the fourth code word 132, or a combination thereof for transmission specifically from the second device 106, the third device 108, a specific antenna therein, for a specific transmission slot or opportunity, a sequence thereof, or a combination thereof.

The computing system 100 can further utilize the precoding process with a first pre-coding mechanism 136 and a second pre-coding mechanism 138. The first pre-coding mechanism 136 and the second pre-coding mechanism 138 can each include entirety of the overall pre-coding mechanism 134, unique non-overlapping portions therein, or a combination thereof. The first pre-coding mechanism 136 and the second pre-coding mechanism 138 can include a factor, a control parameter, a process or a method associated thereto, an assignment, a sequence, or a combination thereof for exploiting transmit diversity unique to corresponding instance of the transmitting device.

For example, the first pre-coding mechanism 136, the second pre-coding mechanism 138, or a combination thereof can correspond to the second device 106, to the third device 108, or a combination thereof. As a more specific example, the first pre-coding mechanism 136 can correspond to the second device 106 and the second pre-coding mechanism 138 can correspond to the third device 108.

Also for example, the first pre-coding mechanism 136, the second pre-coding mechanism 138, or a combination thereof can correspond to entirety of the overall communication content 114 or portions therein, such as for the first transmission content 116, the second transmission content 118, or a combination thereof. As a more specific example, the first pre-coding mechanism 136 can correspond to the first transmission content 116 and the second pre-coding mechanism 138 can correspond to the second transmission content 118.

The computing system 100 can transmit the overall encoded message 120 to the intended device. The computing system 100 can utilize multiple separate devices to transmit the overall encoded message 120 for utilizing joint transmission, including the blind-joint transmission 110. For example, the computing system 100 can use the second device 106, the third device 108, or a combination thereof to transmit first transmitter signal 140, second transmitter signal 142, or a combination thereof.

The first transmitter signal 140 can include actual signal or information transmitted at one instance of the transmitting device for the joint transmission of the content. The second transmitter signal 142 can include actual signal or information transmitted at a different instance of the transmitting device for the joint transmission of the content. The first transmitter signal 140 can be simultaneously transmitted and contemporaneous with the second transmitter signal 142.

For example, the first transmitter signal 140 can include the actual signal or information transmitted by the second device 106 and the second transmitter signal 142 can include the actual signal or information transmitted by the third device 106 simultaneously with the first transmitter signal 140. Also for example, the first transmitter signal 140 can correspond to the first encoded set 122 and the second transmitter signal 142 can correspond to the second encoded set 124. The first transmitter signal 140, the second transmitter signal 142, or a combination thereof can include the information further processed from the encoded output, such as based on the modulation scheme, precoding scheme, or a combination thereof.

The transmitted signals can traverse a communication channel between devices, such as the transmitting device and the receiving device. The communication channel can include a direct link between corresponding devices, such as between the first device 102 and the second device 106 or between the first device 102 and the third device 108. The communication channel can also include repeaters, amplifiers, or a combination thereof there-between for an indirect link.

The communication channel can include a specific instance or value of communication detail, such as frequency, time slot, packet designation, transmission rate, channel code, or a combination thereof used for transmitting signals between intended devices. The communication channel can further include physical characteristics unique to geographic locations associated with the intended devices. The communication channel can include structures or influences, such as fading characteristics of signals or causes for unique delay or reflection of signals, affecting the transmission of wireless signals. The communication channel can distort or alter the signals traversing therein.

The communication channel can include a first transmission channel 144 and a second transmission channel 146. The first transmission channel 144 can include the communication channel between the first device 102 and the second device 106. The second transmission channel 146 can include the communication channel between the first device 102 and the third device 108.

For example, the first transmission channel 144 can correspond to the first transmission content 116, the first encoded set 122, the first pre-coding mechanism 136, the first transmitter signal 140, or a combination thereof. Also for example, the second transmission channel 146 can correspond to the second transmission content 118, the second encoded set 124, the second pre-coding mechanism 138, the second transmitter signal 142, or a combination thereof. Also for example, the first transmission channel 144 and the second transmission channel 146 can correspond to the overall communication content 114, the overall encoded message 120, the overall pre-coding mechanism 134, or a combination thereof.

The computing system 100 can communicate the overall communication content 114 using full-rank transmission mode 148. The full-rank transmission mode 148 is a configuration or a setting, a method or a process, or a combination thereof utilizing all available or applicable resources in transmitting signals to a device.

For example, the full-rank transmission mode 148 can include utilization of all applicable transmitting devices, such as the second device 106, the third device 108, any additional applicable UE or base station able to transmit signal to the intended receiver, or a combination thereof for communicating the overall communication content 114. Also for example, the full-rank transmission mode 148 can include utilization of all applicable or available transmitting antennas, such as on the second device 106, the third device 108, any additional applicable UE or base station, or a combination thereof for communicating the overall communication content 114.

The computing system 100 can use an advanced receiver 150 for communicating information. The advanced receiver 150 is a device including capability to process information exceeding physical receiving configuration of the device.

The advanced receiver 150 can include the device or a portion therein capable of processing receiver signal 152 corresponding to information exceeding receiver capacity 154. For example the advanced receiver 150 can receive, detect, decode, or a combination thereof for the receiver signal 152 corresponding to transmitted signals associated with transmission capacity 156 equal to or exceeding the receiver capacity 154. Also for example, the advanced receiver 150 can include an interference-aware receiver.

The receiver signal 152 can include the actual information available at the receiving device. For example, the receiver signal 152 can include energy level accessed by the first device 102. Also for example, the receiver signal 152 can include portions corresponding to the transmitted signal, such as the first transmitter signal 140, the second transmitter signal 142, or a combination thereof from the second device 106, the third device 108, or a combination thereof. Also for example, the receiver signal 152 can include the distortions or the degradation in the signal from the communication channel, noise or erroneous components, or a combination thereof.

The receiver capacity 154 can include a number of sources or portions in the receiving device available for receiving the communication information. For example, the receiver capacity 154 can include a count of antennas, ports, or a combination thereof at the first device 102. The transmission capacity 156 can include a number of sources or portions in the transmitting device available for sending the communication information. For example, the transmission capacity 156 can include a count of antennas, ports, or a combination thereof at the second device 106, the third device 108, or a combination thereof.

The receiving device can process the receiver signal 152 to calculate channel estimation 158. The channel estimation 158 can be a representation or a characterization of an environment or a connection between devices exchanging information. The channel estimation 158 can include a characterization of the communication channel.

The channel estimation 158 can represent or characterize fading, distortions or alterations from delayed signals or echoes, or a combination thereof for the communication channel. The channel estimation 158 can further represent or quantize degradation, loss, change, distortion, alteration, or a combination thereof in the signal caused by traversing the communication channel.

For example, the channel estimation 158 can describe or estimate changes in the first transmitter signal 140, the second transmitter signal 142, or a combination thereof. Also for example, the channel estimation 158 can describe or characterize the first transmission channel 144, the second transmission channel 146, or a combination thereof.

As a more specific example, the channel estimation 158 can include a matrix with a set of values representing changes to originally transmitted signal, observed at the receiving device after traversing the serving channel. Also as a more specific example, the channel estimation 158 can include a channel quality indicator (CQI), a channel state information (CSI), a precoding matrix index (PMI), or a combination thereof.

The computing system 100 can operate with or without transmitter channel-information 160 from the receiving device. The transmitter channel-information 160 can be information or knowledge regarding the communication channel for the transmitting device.

For example, the transmitter channel-information 160 can include a prediction regarding the communication channel calculated by the second device 106, the third device 108, or a combination thereof. Also for example, the transmitter channel-information 160 can include feedback information from the receiving device, such as the channel estimation 158 including or based on CQI, CSI, PMI, or a combination thereof.

As a more specific example, the transmitter channel-information 160 can include the channel estimation 158, channel state information at the transmitter (CSIT), global channel information, or a combination thereof. Also as a more specific example, the computing system 100 can communicate the overall communication content 114 without utilizing the transmitter channel-information 160 for open-loop communication, where the receiving device does not provide feedback information, including information regarding the communication channel, back to the transmitting device.

The computing system 100 can communicate the overall communication content 114 using the blind-joint transmission 110. The computing system 100 can communicate the overall communication content 114 without utilizing the transmitter channel-information 160, such that the overall pre-coding mechanism 134 can be generated without utilizing the channel estimation 158, CQI, CSI, nor PMI. The computing system 100 can further communicate in an overload transmission mode 162 up to the full-rank transmission mode 148 using the advanced receiver 150.

The overload transmission mode 162 a configuration or a setting, a method or a process, or a combination thereof utilizing transmitting resources exceeding receiving resources. The overload transmission mode 162 can include utilizing the transmission capacity 156 greater than or equal to the receiving capacity. For example, the overload transmission mode 162 can include utilizing a number of transmitting devices, a number of transmitting antennas, or a combination thereof exceeding a number of receiving antennas.

As a more specific example, the computing system 100 can transmit from multiple antennas for a receiver including one receiving antenna, such as for normally intended for a single-input single-output (SISO) communication format. As a more specific example, the computing system 100 can further simultaneously utilize four instances of transmission sources for a receiver including two receiving antennas, such as for a multiple-input multiple-output (MIMO) communication format.

The overload transmission mode 162 can be limited up to the full-rank transmission mode 148. The computing system 100 can utilize the overload transmission mode 162 or the full-rank transmission mode 148 regardless of the receiver capacity 154 for the advanced receiver 150. Details regarding communication of the overall encoded message 120 for the blind joint transmission 110 are described below.

For illustrative purposes, the computing system 100 is described with the second device 106 and the third device 108 sending information to the first device 102. However, it is understood that information can be sent from and to any of the devices in the computing system 100. For example, the first device 102, the second device 106, the third device 108, or a combination thereof can send the overall communication content 114, receive the overall communication content 114, or a combination thereof.

Also for illustrative purposes, the computing system 100 is described using wireless communication. However, it is understood that the processes described herein can be used for wired communications.

Also for illustrative purposes, the computing system 100 is described with two base stations sending information. However, it is understood that the computing system 100 can use UE to transmit information to another UE. It is also understood that the computing system 100 can utilize three or more sources for sending information.

Also for illustrative purposes, the computing system 100 is described as an open-loop system without any feedback information regarding the communication channel. However, it is understood that the computing system 100 can include a closed-loop system, channel feedback information communicated between devices, or a combination thereof.

Figure 2:
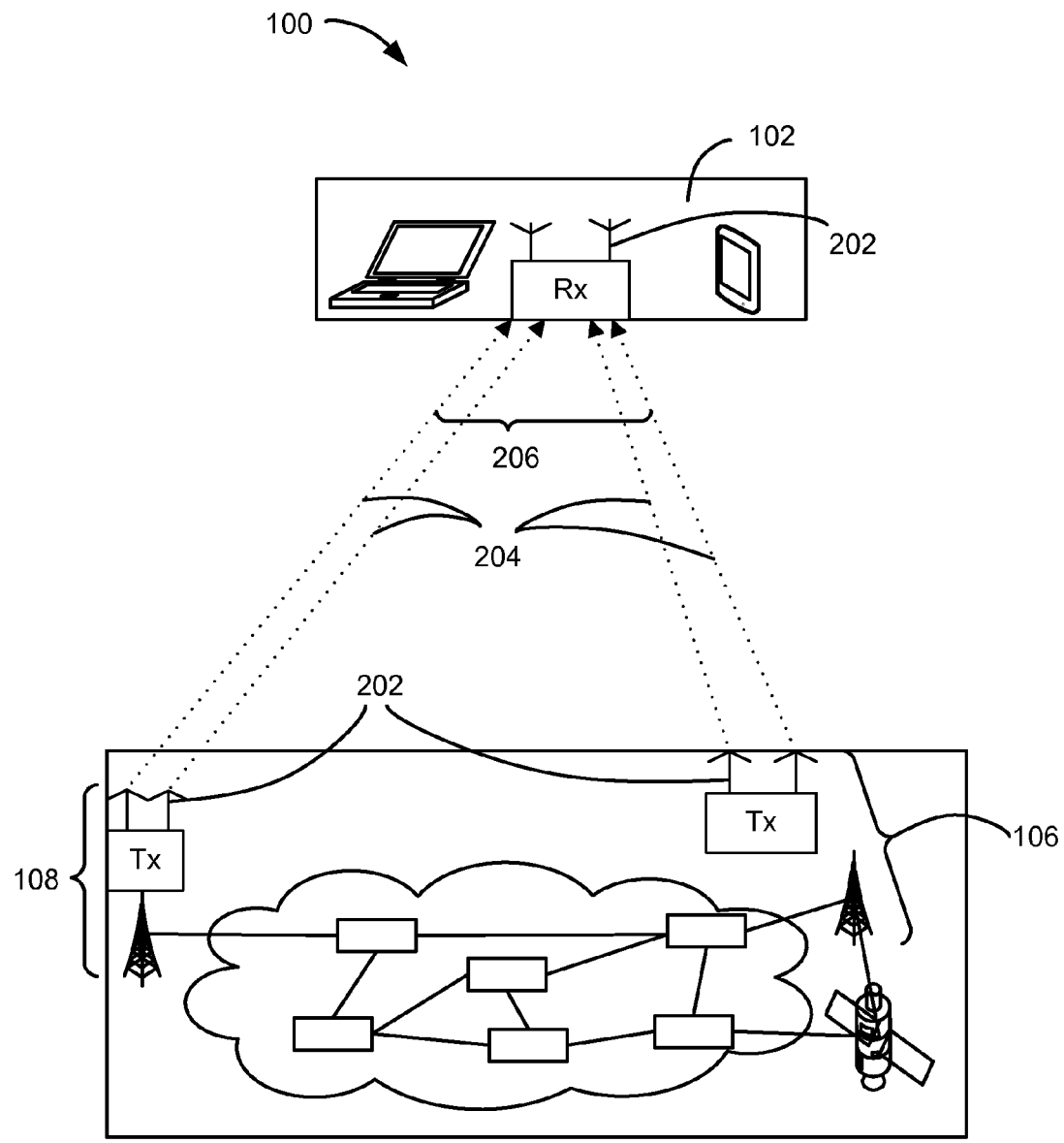
FIG. 2 is an exemplary configuration for the computing system.

Referring now to FIG. 2, therein is shown an exemplary configuration for the computing system 100. The computing system 100 can include an antenna 202. The antenna 202 can include a device or a structure for radiating or receiving radio waves. The antenna 202 can be metallic or conductive device specialized for responding to electro-magnetic energy or changes therein. The first device 102, the second device 106, the third device 108, or a combination thereof.

For example, the first device 102 can include a set of the antenna 202 according to the receiver capacity 154 of FIG. 1. Also for example, the second device 106 and the third device 108 can each include a set of the antenna 202 according to the transmission capacity 156 of FIG. 1 corresponding thereto. As a more specific example, the first device 102, the second device 106, the third device 108 can each include two instances of the antenna 202.

The computing system 100 can include communicate utilizing a set of data layers 204. Each of the data layers 204 can represent a stream of unique communication. Each of the data layers 204 can represent a set of unique information communicated between devices. The data layers 204 can represent the sets of unique information transmitted simultaneously or contemporaneously. Each of the data layers 204 can further correspond to a unique combination or pairing between transmission antenna and receiving antenna.

The computing system 100 can include a layer count 206 representing a quantity of the data layers 204. The layer count 206 can be based on the transmission capacity 156 regardless of the receiver capacity 154 for the computing system 100 utilizing the blind-joint transmission 110 to communicate with the advanced receiver 150 of FIG. 1.

For example, the layer count 206 can be greater than the receiver capacity 154 for the overload transmission mode 162 of FIG. 1. Also for example, the layer count 206 can be same as the transmission capacity 156 for the full-rank transmission mode 148 of FIG. 1 regardless of the receiver capacity 154.

Figure 3:
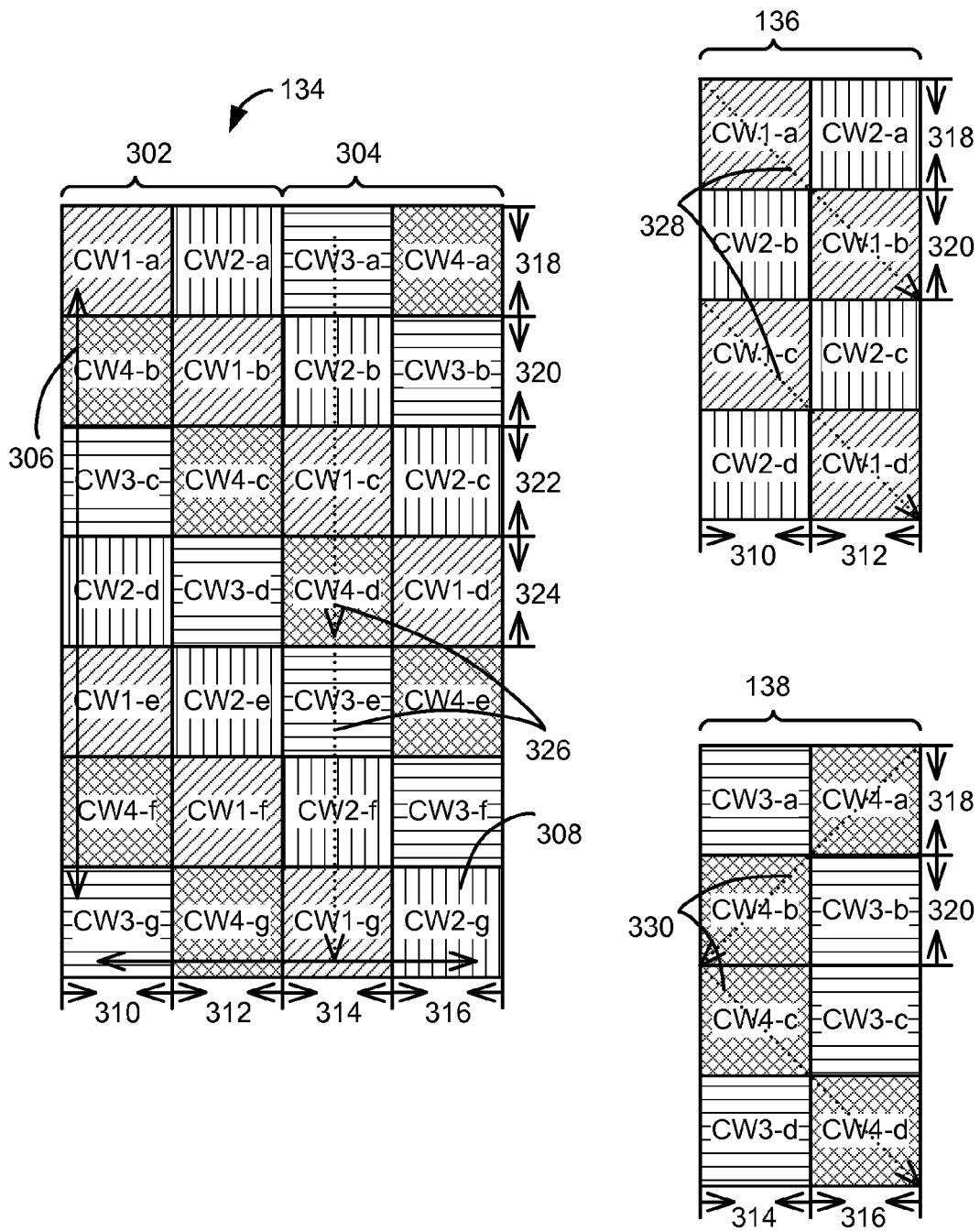
FIG. 3 is an exemplary illustration for the precoding process.

Referring now to FIG. 3, therein is shown an exemplary illustration for the precoding process. The computing system 100 of FIG. 1 can utilize the precoding process in sending the content. The computing system 100 can utilize the overall pre-coding mechanism 134, the first pre-coding mechanism 136, the second pre-coding mechanism 138, or a combination thereof for the precoding process. The computing system 100 can utilize the overall pre-coding mechanism 134, the first pre-coding mechanism 136, the second pre-coding mechanism 138, or a combination thereof for assigning specific data to be transmitted from a specific device, a specific antenna, or a combination thereof.

For example, the computing system 100 can utilize the overall pre-coding mechanism 134 including a first transmission portion 302 and a second transmission portion 304 therein. The first transmission portion 302 and the second transmission portion 304 can include unique and non-overlapping portions of the overall pre-coding mechanism 134 each corresponding to a unique transmission device.

As a more specific example, the first transmission portion 302 can correspond to the second device 106 of FIG. 1, the first transmitter signal 140 of FIG. 1, the first transmission content 116 of FIG. 1 including or representing the entirety of the overall communication content 114 of FIG. 1, or a combination thereof. Also as a more specific example, the second transmission portion 304 can correspond to the third device 108 of FIG. 1, the second transmitter signal 142 of FIG. 1, the second transmission content 118 of FIG. 1 including or representing the entirety of the overall communication content 114, or a combination thereof.

The precoding process, including the first transmission portion 302 and the second transmission portion 304, can correspond to a first direction sequence 306, a second direction sequence 308, or a combination thereof. The first direction sequence 306 and the second direction sequence 308 can each be an arrangement of the factors, the control parameters, the process or the method associated thereto, the ordering or specific relative relationships thereof, the assignment or a combination thereof along unique and orthogonal directions or dimensions.

For example, the first direction sequence 306 can represent a sequence of code words scheduled to be transmitted from a specific instance of the antenna 202 of FIG. 2 in the computing system 100. The first direction sequence 306 is exemplified along columns in FIG. 3.

Also for example, the second direction sequence 308 can represent a set of code words scheduled to be transmitted simultaneously at a given time or slot across all instances of the antenna 202 at in the computing system 100 for communicating to a specific receiver. The second direction sequence 308 can represent the set of code words scheduled to be transmitted for the antenna 202 on the second device 106, the third device 108, or a combination thereof. The second direction sequence 308 is exemplified along rows in FIG. 3.

As a more specific example, the overall pre-coding mechanism 134 can include a first antenna slot 310, a second antenna slot 312, a third antenna slot 314, and a fourth antenna slot 316, each as an instance of the first direction sequence 306 corresponding to a unique instance of the antenna 202. The first antenna slot 310 and the second antenna slot 312 can correspond to instances of the antenna 202 on the second device 106. The first antenna slot 310 and the second antenna slot 312 can further correspond to the first transmission portion 302.

Continuing with the example, the third antenna slot 314 and the fourth antenna slot 316 can correspond to instances of the antenna 202 on the third device 108. The third antenna slot 314 and the fourth antenna slot 316 can further correspond to the second transmission portion 304.

Continuing with the example, the overall pre-coding mechanism 134 can include a first transmission slot 318, a second transmission slot 320, a third transmission slot 322, and a fourth transmission slot 324, each as an instance of the second direction sequence 308 corresponding to a specific transmission time or opportunity in schedule. The first transmission slot 318, the second transmission slot 320, the third transmission slot 322, and the fourth transmission slot 324 can each describe a portion of the overall pre-coding mechanism 134, such as the code word, scheduled to be transmitted from each of the antennas at a corresponding time or instance.

Continuing with the example, the computing system 100 can determine the first pre-coding mechanism 136 as the first transmission portion 302 and determine the second pre-coding mechanism 138 as the second transmission portion 304. The computing system 100 can use the first pre-coding mechanism 136 and the second pre-coding mechanism 138 to transmit entirety of the overall communication content 114 from each of the second device 106 and the third device 108, each of the antennas therein designated for communicating with the first device 102, or a combination thereof.

Continuing with the example, the computing system 100 can distribute or communicate the entirety of the overall communication content 114 to each of the transmitting device. As a further specific example, the computing system 100 can distribute or communicate the overall communication content 114 to each of the transmitting devices, such as the second device 106 and the third device 108. Each of the transmitting devices can generate the first code word 126 of FIG. 1, the second code word 128 of FIG. 1, the third code word 130 of FIG. 1, and the fourth code word 132 of FIG. 1, such as for each of the first encoded set 122 of FIG. 1 and the second encoded set 124 of FIG. 1.

Also as a more specific example, the computing system 100 can determine the first pre-coding mechanism 136 and the second pre-coding mechanism 138 each as portions within the overall communication content 114 or encoded information corresponding thereto. The first pre-coding mechanism 136 is exemplified in FIG. 3 as including the first antenna slot 310 and the second antenna slot 312. The second pre-coding mechanism 138 is further exemplified in FIG. 3 as including the third antenna slot 314 and the fourth antenna slot 316.

Continuing with the example, the first pre-coding mechanism 136 can schedule the first code word 126 and the second code word 128, without the third code word 130 and without the fourth code word 132. The second pre-coding mechanism 138 can schedule the third code word 130 and the fourth code word 132, without the first code word 126 and without the fourth code word 132.

Continuing with the example, the computing system 100 can use the first pre-coding mechanism 136 and the second pre-coding mechanism 138 to transmit unique portions of the overall communication content 114 from each of the second device 106 and the third device 108, each of the antennas therein designated for communicating with the first device 102, or a combination thereof.

Continuing with the example, the computing system 100 can distribute or communicate unique portions of the overall communication content 114 to each of the transmitting device, such as the second device 106 and the third device 108. As a further specific example, the computing system 100 can distribute or communicate unique portions of the overall communication content 114 to each of the transmitting devices, such as the second device 106 and the third device 108. The second device 106 can generate the first code word 126 and the second code word 128, without the third code word 130 and the fourth code word 132, for the first encoded set 122. The third device 108 can generate the third code word 130 and the fourth code word 132, without the first code word 126 and the second code word 128, for the second encoded set 124.

The computing system 100 can utilize a rotating pattern 326, a parallel diagonal pattern 328, or a combination thereof for the precoding process. The rotating pattern 326 is a design or an arrangement including repetitive combinations for transmitting across multiple transmitting points. The rotating pattern 326 can distribute transmission of the overall communication content 114 evenly across multiple devices, such as the second device 106 and the third device 108, across multiple antennas, such as corresponding to the second device 106 and the third device 108, or a combination thereof over a period of time.

As specifically exemplified in FIG. 3, the first code word 126 can be scheduled for the first antenna slot 310, the second code word 128 can be scheduled for the second antenna slot 312, the third code word 130 can be scheduled for the third antenna slot 314, and the fourth code word 132 can be scheduled for the fourth antenna slot 316 for the first transmission slot 318 of the overall pre-coding mechanism 134. The rotating pattern 326 can increment antenna assignments with wrap-arounds or circular buffer for scheduling code words for each subsequent transmission slots.

Continuing with the example, the fourth code word 132 can be scheduled for the first antenna slot 310, the first code word 126 can be scheduled for the second antenna slot 312, the second code word 128 can be scheduled for the third antenna slot 314, and the third code word 130 can be scheduled for the fourth antenna slot 316 for the second transmission slot 320. The code words can similarly increment in horizontal direction for the third transmission slot 322 and the fourth transmission slot 324 as exemplified in FIG. 3 for the rotating pattern 326.

Continuing with the example, the rotating pattern 326 can include a parallel diagonal pattern 328 for each instance of the code word. The parallel diagonal pattern 328 can represent a horizontal movement or migration in antenna assignment across available antennas over multiple transmission slots. The parallel diagonal pattern 328 can further represent same horizontal movement or migration, such as in same increment and same direction, for all portions of the overall encoded message 120 of FIG. 1, such as for all code words therein.

The rotating pattern 326 can further include an alternating diagonal pattern 330. The alternating diagonal pattern 330 can represent an alternating pattern of horizontal movement or migration in antenna assignment across available antennas repeated over multiple transmission slots. The alternating diagonal pattern 330 can represent a horizontal movement or migration in antenna assignment and a change in the horizontal movement, such as in direction or increment, repeated after a predetermined number of transmission slots. The alternating diagonal pattern 330, as illustrated in the second pre-coding mechanism 138 for FIG. 3, can provide intersecting diagonal movement patterns for different portions of the overall encoded message 120, such as for all code words therein.

For illustrative purposes, the rotating pattern 326 is described as diagonal patterns across antenna assignments over transmission slots. However, it is understood that the rotating pattern 326 can be any regular pattern for evenly distributing the transmission of each portion of the overall communication content 114 across all available transmission points, such as devices or the antennas therein.

As a more specific example, the rotating pattern 326 can be applicable for the overall pre-coding mechanism 134, the first pre-coding mechanism 136, the second pre-coding mechanism 138, or a combination thereof for transmitting a unique instance of the code word from each of the available antennas as shown in FIG. 3. Also as a more specific example, the rotating pattern 326 can be applicable for the overall pre-coding mechanism 134, the first pre-coding mechanism 136, the second pre-coding mechanism 138, or a combination thereof for transmitting all code words from each of the available antennas utilizing a unique factor for each code word.

Continuing with the first antenna slot 310, the second antenna slot 312, the third antenna slot 314, the fourth antenna slot 316, or a combination thereof can each transmit the first code word 126, the second code word 128, the third code word 130, the fourth code word 132, or a combination thereof. Each of the code words can be combined with a unique factor as described by the overall pre-coding mechanism 134, the first pre-coding mechanism 136, the second pre-coding mechanism 138, or a combination thereof.

Continuing with the example, the set or a sequence of the unique factors as described by the overall pre-coding mechanism 134, the first pre-coding mechanism 136, the second pre-coding mechanism 138, or a combination thereof for each of the code words can change across transmission slots according to the rotating pattern 326. The unique factors as described by the overall pre-coding mechanism 134, the first pre-coding mechanism 136, the second pre-coding mechanism 138, or a combination thereof can further include a unique set of values for the same instance of the code word across the multiple antennas. The rotating pattern 326 can include an offset corresponding to each of the antennas.

The rotating pattern 326 can be based on a size or quantity of the overall communication content 114, the first transmission content 116, the second transmission content 118, or a combination thereof. The rotating pattern 326 can further be based on the transmission capacity 156. Details regarding the precoding process are described below.

Figure 4:
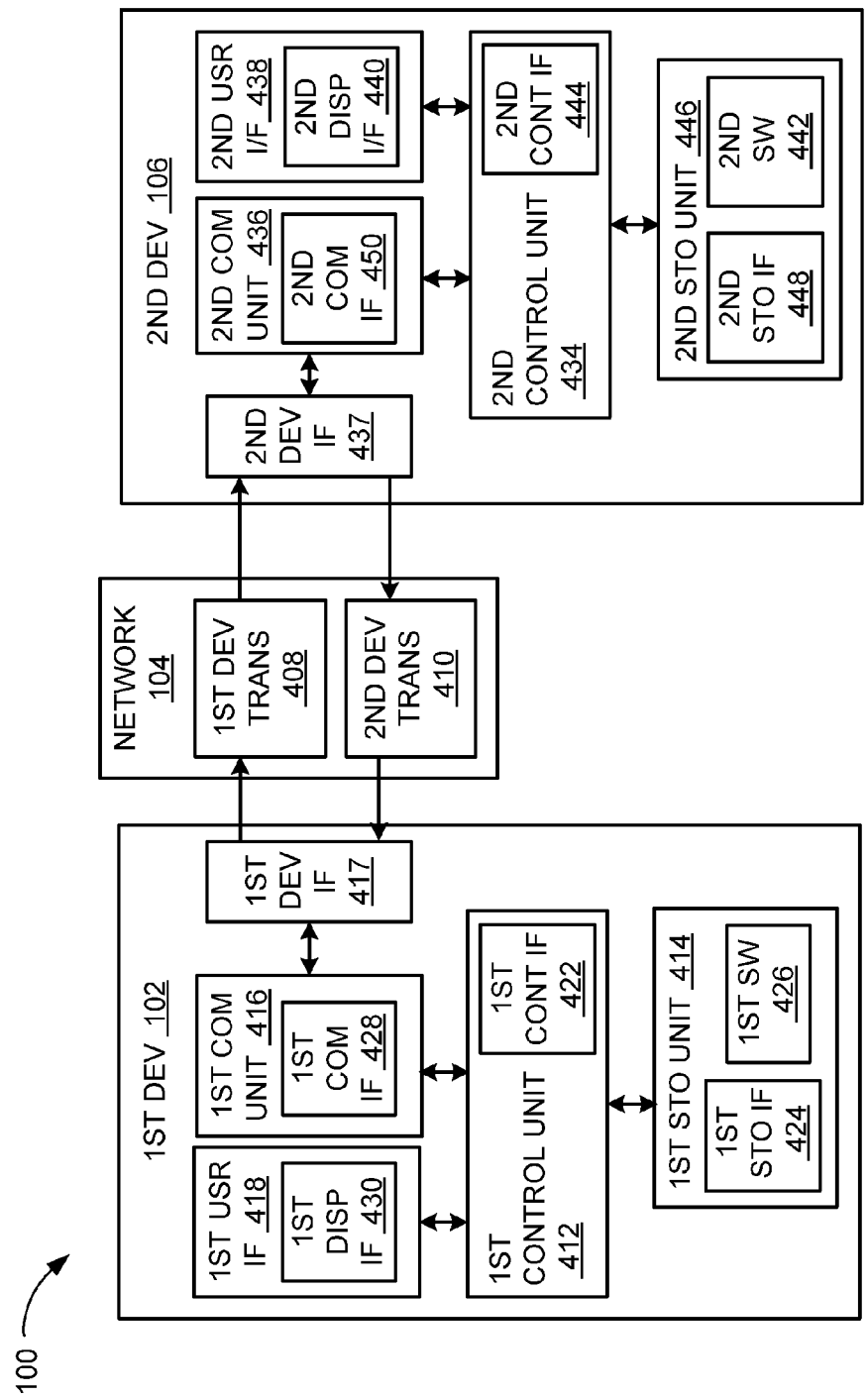
FIG. 4 is an exemplary block diagram of the computing system.

Referring now to FIG. 4, therein is shown an exemplary block diagram of the computing system 100. The computing system 100 can include the first device 102, the network 104, and the second device 106. The first device 102 can send information in a first device transmission 408 over the network 104 to the second device 106. The second device 106 can send information in a second device transmission 410 over the network 104 to the first device 102.

For illustrative purposes, the computing system 100 is shown with the first device 102 as a client device, although it is understood that the computing system 100 can have the first device 102 as a different type of device. For example, the first device 102 can be a server having a display interface.

Also for illustrative purposes, the computing system 100 is shown with the second device 106 as a server, although it is understood that the computing system 100 can have the second device 106 as a different type of device. For example, the second device 106 can be a client device.

For brevity of description, the first device 102 will be described as a client device and the second device 106 will be described as a server device. The embodiment is not limited to this selection for the type of devices. The selection is an example of an embodiment.

The first device 102 can include a first control unit 412, a first storage unit 414, a first communication unit 416, and a first user interface 418. The first control unit 412 can include a first control interface 422. The first control unit 412 can execute a first software 426 to provide the intelligence of the computing system 100.

The first control unit 412 can be implemented in a number of different manners. For example, the first control unit 412 can be a processor, an application specific integrated circuit (ASIC) an embedded processor, a microprocessor, a hardware control logic, a hardware finite state machine (FSM), a digital signal processor (DSP), or a combination thereof.

The first control interface 422 can be used for communication between the first control unit 412 and other functional units in the first device 102. The first control interface 422 can also be used for communication that is external to the first device 102.

The first control interface 422 can receive information from the other functional units or from external sources, or can transmit information to the other functional units or to external destinations. The external sources and the external destinations refer to sources and destinations external to the first device 102.

The first control interface 422 can be implemented in different ways and can include different implementations depending on which functional units or external units are being interfaced with the first control interface 422. For example, the first control interface 422 can be implemented with a pressure sensor, an inertial sensor, a microelectromechanical system (MEMS), optical circuitry, waveguides, wireless circuitry, wireline circuitry, or a combination thereof.

The first storage unit 414 can store the first software 426. The first storage unit 414 can also store the relevant information, such as data representing incoming images, data representing previously presented image, sound files, or a combination thereof.

The first storage unit 414 can be a volatile memory, a nonvolatile memory, an internal memory, an external memory, or a combination thereof. For example, the first storage unit 414 can be a nonvolatile storage such as non-volatile random access memory (NVRAM), Flash memory, disk storage, or a volatile storage such as static random access memory (SRAM).

The first storage unit 414 can include a first storage interface 424. The first storage interface 424 can be used for communication between the first storage unit 414 and other functional units in the first device 102. The first storage interface 424 can also be used for communication that is external to the first device 102.

The first storage interface 424 can receive information from the other functional units or from external sources, or can transmit information to the other functional units or to external destinations. The external sources and the external destinations refer to sources and destinations external to the first device 102.

The first storage interface 424 can include different implementations depending on which functional units or external units are being interfaced with the first storage unit 414. The first storage interface 424 can be implemented with technologies and techniques similar to the implementation of the first control interface 422.

The first communication unit 416 can enable external communication to and from the first device 102. For example, the first communication unit 416 can permit the first device 102 to communicate with the second device 106, a different device, an attachment, such as a peripheral device or a desktop computer, the network 104, or a combination thereof.

The first communication unit 416 can also function as a communication hub allowing the first device 102 to function as part of the network 104 and not limited to be an end point or terminal unit to the network 104. The first communication unit 416 can include active and passive components, such as microelectronics or an antenna, for interaction with the network 104.

The first communication unit 416 can include a baseband device or component, a modem, a digital signal processor, or a combination thereof for transmitting, formatting, receiving, detecting, decoding, further processing, or a combination thereof for communication signals. The first communication unit 416 can include one or more portions for processing the voltages, the currents, the digital information, or a combination thereof, such as an analog-to-digital converter, a digital-to-analog converter, a filter, an amplifier, a processor-type circuitry, or a combination thereof. The first communication unit 416 can further include one or more portions for storing information, such as cache or RAM memory, registers, or a combination thereof.

The first communication unit 416 can be coupled with a first inter-device interface 417. The first inter-device interface 417 can be a device or a portion of a device for physically communicating signals with a separate device. The first inter-device interface 417 can communicate by transmitting or receiving signals to or from another device. The first inter-device interface 417 can include one or more instances of the antenna 202 of FIG. 2 for wireless signals, a physical connection and receiver-transmitter for wired signals, or a combination thereof. The first inter-device interface 417 can include an omnidirectional antenna, a wire, an antenna chip, a ceramic antenna, or a combination thereof. The first inter-device interface 417 can further include a port, a wire, a repeater, a connector, a filter, a sensor, or a combination thereof.

The first inter-device interface 417 can detect or respond to a power in electromagnetic waves and provide the detected result to the first communication unit 416 to receive a signal, including the second device transmission 410. The first inter-device interface 417 can provide a path or respond to currents or voltages provided by the first communication unit 416 to transmit a signal, including the first device transmission 408.

The first communication unit 416 can include a first communication interface 428. The first communication interface 428 can be used for communication between the first communication unit 416 and other functional units in the first device 102. The first communication interface 428 can receive information from the other functional units or can transmit information to the other functional units.

The first communication interface 428 can include different implementations depending on which functional units are being interfaced with the first communication unit 416. The first communication interface 428 can be implemented with technologies and techniques similar to the implementation of the first control interface 422.

The first user interface 418 allows a user (not shown) to interface and interact with the first device 102. The first user interface 418 can include an input device and an output device. Examples of the input device of the first user interface 418 can include a keypad, a touchpad, soft-keys, a keyboard, a microphone, an infrared sensor for receiving remote signals, or any combination thereof to provide data and communication inputs.

The first user interface 418 can include a first display interface 430. The first display interface 430 can include an output device. The first display interface 430 can include a display, a projector, a video screen, a speaker, or any combination thereof.

The first control unit 412 can operate the first user interface 418 to display information generated by the computing system 100. The first control unit 412 can also execute the first software 426 for the other functions of the computing system 100. The first control unit 412 can further execute the first software 426 for interaction with the network 104 via the first communication unit 416.

The second device 106 can be optimized for implementing an embodiment in a multiple device embodiment with the first device 102. The second device 106 can provide the additional or higher performance processing power compared to the first device 102. The second device 106 can include a second control unit 434, a second communication unit 436, a second user interface 438, and a second storage unit 446.

The second user interface 438 allows a user (not shown) to interface and interact with the second device 106. The second user interface 438 can include an input device and an output device. Examples of the input device of the second user interface 438 can include a keypad, a touchpad, softkeys, a keyboard, a microphone, or any combination thereof to provide data and communication inputs. Examples of the output device of the second user interface 438 can include a second display interface 440. The second display interface 440 can include a display, a projector, a video screen, a speaker, or any combination thereof.

The second control unit 434 can execute a second software 442 to provide the intelligence of the second device 106 of the computing system 100. The second software 442 can operate in conjunction with the first software 426. The second control unit 434 can provide additional performance compared to the first control unit 412.

The second control unit 434 can operate the second user interface 438 to display information. The second control unit 434 can also execute the second software 442 for the other functions of the computing system 100, including operating the second communication unit 436 to communicate with the first device 102 over the network 104.

The second control unit 434 can be implemented in a number of different manners. For example, the second control unit 434 can be a processor, an embedded processor, a microprocessor, hardware control logic, a hardware finite state machine (FSM), a digital signal processor (DSP), or a combination thereof.

The second control unit 434 can include a second control interface 444. The second control interface 444 can be used for communication between the second control unit 434 and other functional units in the second device 106. The second control interface 444 can also be used for communication that is external to the second device 106.

The second control interface 444 can receive information from the other functional units or from external sources, or can transmit information to the other functional units or to external destinations. The external sources and the external destinations refer to sources and destinations external to the second device 106.

The second control interface 444 can be implemented in different ways and can include different implementations depending on which functional units or external units are being interfaced with the second control interface 444. For example, the second control interface 444 can be implemented with a pressure sensor, an inertial sensor, a microelectromechanical system (MEMS), optical circuitry, waveguides, wireless circuitry, wireline circuitry, or a combination thereof.

A second storage unit 446 can store the second software 442. The second storage unit 446 can also store the information such as data representing incoming images, data representing previously presented image, sound files, or a combination thereof. The second storage unit 446 can be sized to provide the additional storage capacity to supplement the first storage unit 414.

For illustrative purposes, the second storage unit 446 is shown as a single element, although it is understood that the second storage unit 446 can be a distribution of storage elements. Also for illustrative purposes, the computing system 100 is shown with the second storage unit 446 as a single hierarchy storage system, although it is understood that the computing system 100 can have the second storage unit 446 in a different configuration. For example, the second storage unit 446 can be formed with different storage technologies forming a memory hierarchal system including different levels of caching, main memory, rotating media, or off-line storage.

The second storage unit 446 can be a volatile memory, a nonvolatile memory, an internal memory, an external memory, or a combination thereof. For example, the second storage unit 446 can be a nonvolatile storage such as non-volatile random access memory (NVRAM), Flash memory, disk storage, or a volatile storage such as static random access memory (SRAM).

The second storage unit 446 can include a second storage interface 448. The second storage interface 448 can be used for communication between the second storage unit 446 and other functional units in the second device 106. The second storage interface 448 can also be used for communication that is external to the second device 106.

The second storage interface 448 can receive information from the other functional units or from external sources, or can transmit information to the other functional units or to external destinations. The external sources and the external destinations refer to sources and destinations external to the second device 106.

The second storage interface 448 can include different implementations depending on which functional units or external units are being interfaced with the second storage unit 446. The second storage interface 448 can be implemented with technologies and techniques similar to the implementation of the second control interface 444.

The second communication unit 436 can enable external communication to and from the second device 106. For example, the second communication unit 436 can permit the second device 106 to communicate with the first device 102 over the network 104.

The second communication unit 436 can also function as a communication hub allowing the second device 106 to function as part of the network 104 and not limited to be an end point or terminal unit to the network 104. The second communication unit 436 can include active and passive components, such as microelectronics or resistors, for interaction with the network 104.

The second communication unit 436 can include a baseband device or component, a modem, a digital signal processor, or a combination thereof for transmitting, formatting, receiving, detecting, decoding, further processing, or a combination thereof for communication signals. The second communication unit 436 can include one or more portions for processing the voltages, the currents, the digital information, or a combination thereof, such as an analog-to-digital converter, a digital-to-analog converter, a filter, an amplifier, a processor-type circuitry, or a combination thereof. The second communication unit 436 can further include one or more portions for storing information, such as cache or RAM memory, registers, or a combination thereof.

The second communication unit 436 can be coupled with a second inter-device interface 437. The second inter-device interface 437 can be a device or a portion of a device for physically communicating signals with a separate device. The second inter-device interface 437 can communicate by transmitting or receiving signals to or from another device. The second inter-device interface 437 can include one or more instance of the antenna 202 for wireless signals, a physical connection and receiver-transmitter for wired signals, or a combination thereof. The second inter-device interface 437 can include an omnidirectional antenna, a wire, an antenna chip, a ceramic antenna, or a combination thereof. The second inter-device interface 437 can further include a port, a wire, a repeater, a connector, a filter, a sensor, or a combination thereof.

The second inter-device interface 437 can detect or respond to a power in electromagnetic waves and provide the detected result to the second communication unit 436 to receive a signal, including the first device transmission 408. The second inter-device interface 437 can provide a path or respond to currents or voltages provided by the second communication unit 436 to transmit a signal, including the second device transmission 410.

The second communication unit 436 can include a second communication interface 450. The second communication interface 450 can be used for communication between the second communication unit 436 and other functional units in the second device 106. The second communication interface 450 can receive information from the other functional units or can transmit information to the other functional units.

The second communication interface 450 can include different implementations depending on which functional units are being interfaced with the second communication unit 436. The second communication interface 450 can be implemented with technologies and techniques similar to the implementation of the second control interface 444.

The first communication unit 416 can couple with the network 104 to send information to the second device 106 in the first device transmission 408. The second device 106 can receive information in the second communication unit 436 from the first device transmission 408 of the network 104.

The second communication unit 436 can couple with the network 104 to send information to the first device 102 in the second device transmission 410. The first device 102 can receive information in the first communication unit 416 from the second device transmission 410 of the network 104. The computing system 100 can be executed by the first control unit 412, the second control unit 434, or a combination thereof. For illustrative purposes, the second device 106 is shown with the partition having the second user interface 438, the second storage unit 446, the second control unit 434, and the second communication unit 436, although it is understood that the second device 106 can have a different partition. For example, the second software 442 can be partitioned differently such that some or all of its function can be in the second control unit 434 and the second communication unit 436. Also, the second device 106 can include other functional units not shown in FIG. 4 for clarity.

The functional units in the first device 102 can work individually and independently of the other functional units. The first device 102 can work individually and independently from the second device 106 and the network 104.

The functional units in the second device 106 can work individually and independently of the other functional units. The second device 106 can work individually and independently from the first device 102 and the network 104.

The functional units described above can be implemented in hardware. For example, one or more of the functional units can be implemented using a gate, circuitry, a processor, a computer, integrated circuit, integrated circuit cores, a pressure sensor, an inertial sensor, a microelectromechanical system (MEMS), a passive device, a physical non-transitory memory medium having instructions for performing the software function, a portion therein, or a combination thereof.

For illustrative purposes, the computing system 100 is described by operation of the first device 102 and the second device 106. It is understood that the first device 102 and the second device 106 can operate any of the modules and functions of the computing system 100.

Figure 5:
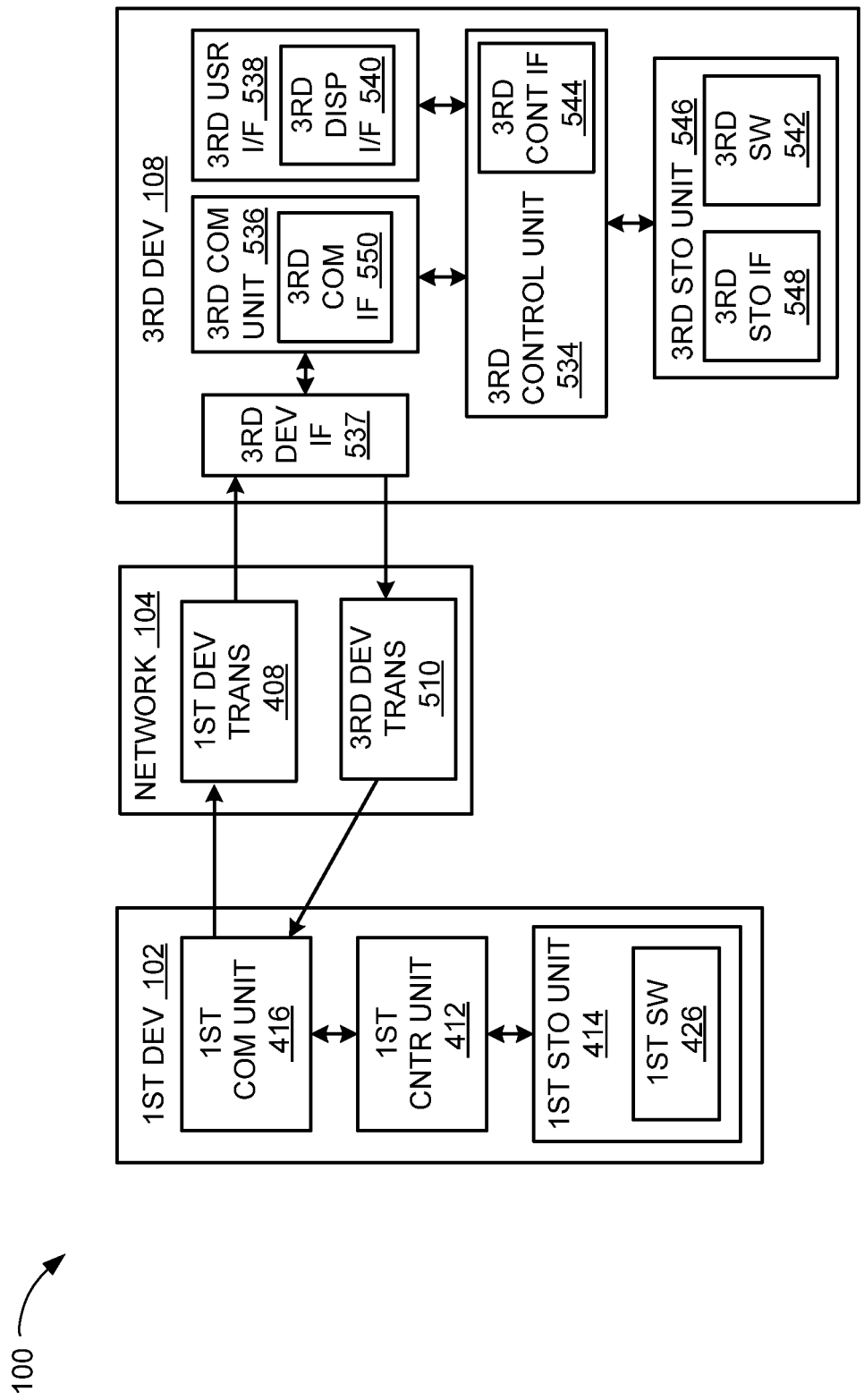
FIG. 5 is a further exemplary block diagram of the computing system.

Referring now to FIG. 5, therein is shown a further exemplary block diagram of the computing system 100. The first device 102 can send information in the first device transmission 408 over the network 104 to the third device 108. The third device 108 can send information in a third device transmission 510 over the network 104 to the first device 102.

For illustrative purposes, the computing system 100 is shown with the third device 108 as a server, although it is understood that the computing system 100 can have the third device 108 as a different type of device. For example, the third device 108 can be a client device.

For brevity of description in this embodiment, the third device 108 will be described as a client device. The embodiment is not limited to this selection for the type of devices. The selection is an example of an embodiment.

The third device 108 can provide the additional or higher performance processing power compared to the first device 102. The third device 108 can include a third control unit 534, a third communication unit 536, and a third user interface 538.

The third user interface 538 allows a user (not shown) to interface and interact with the third device 108. The third user interface 538 can include an input device and an output device. Examples of the input device of the third user interface 538 can include a keypad, a touchpad, touch screen, soft-keys, a keyboard, a microphone, or any combination thereof to provide data and communication inputs. Examples of the output device of the third user interface 538 can include a third display interface 540. The third display interface 540 can include a display, a projector, a video screen, a speaker, or any combination thereof.

The third control unit 534 can execute a third software 542 to provide the intelligence of the third device 108 of the computing system 100. The third software 542 can operate in conjunction with the first software 426, the second software 442 of FIG. 4, or a combination thereof. The third control unit 534 can provide additional performance compared to the first control unit 412.

The third control unit 534 can operate the third user interface 538 to display information. The third control unit 534 can also execute the third software 542 for the other functions of the computing system 100, including operating the third communication unit 536 to communicate with the first device 102, the group-accommodation device 106, or a combination thereof over the network 104.

The third control unit 534 can be implemented in a number of different manners. For example, the third control unit 534 can be a processor, an application specific integrated circuit (ASIC), an embedded processor, a microprocessor, hardware control logic, a hardware finite state machine (FSM), a digital signal processor (DSP), or a combination thereof.

The third control unit 534 can include a third controller interface 544. The third controller interface 544 can be used for communication between the third control unit 534 and other functional units in the third device 108. The third controller interface 544 can also be used for communication that is external to the third device 108.

The third controller interface 544 can receive information from the other functional units or from external sources, or can transmit information to the other functional units or to external destinations. The external sources and the external destinations refer to sources and destinations external to the third device 108.

The third controller interface 544 can be implemented in different ways and can include different implementations depending on which functional units or external units are being interfaced with the third controller interface 544. For example, the third controller interface 544 can be implemented with a pressure sensor, an inertial sensor, a microelectromechanical system (MEMS), optical circuitry, waveguides, wireless circuitry, wireline circuitry, or a combination thereof.

A third storage unit 546 can store the third software 542. The third storage unit 546 can also store the such as data representing incoming images, data representing previously presented image, sound files, or a combination thereof. The third storage unit 546 can be sized to provide the additional storage capacity to supplement the first storage unit 414.

For illustrative purposes, the third storage unit 546 is shown as a single element, although it is understood that the third storage unit 546 can be a distribution of storage elements. Also for illustrative purposes, the computing system 100 is shown with the third storage unit 546 as a single hierarchy storage system, although it is understood that the computing system 100 can have the third storage unit 546 in a different configuration. For example, the third storage unit 546 can be formed with different storage technologies forming a memory hierarchal system including different levels of caching, main memory, rotating media, or off-line storage.

The third storage unit 546 can be a volatile memory, a nonvolatile memory, an internal memory, an external memory, or a combination thereof. For example, the third storage unit 546 can be a nonvolatile storage such as non-volatile random access memory (NVRAM), Flash memory, disk storage, or a volatile storage such as static random access memory (SRAM).

The third storage unit 546 can include a third storage interface 548. The third storage interface 548 can be used for communication between other functional units in the third device 108. The third storage interface 548 can also be used for communication that is external to the third device 108.

The third storage interface 548 can receive information from the other functional units or from external sources, or can transmit information to the other functional units or to external destinations. The external sources and the external destinations refer to sources and destinations external to the third device 108.

The third storage interface 548 can include different implementations depending on which functional units or external units are being interfaced with the third storage unit 546. The third storage interface 548 can be implemented with technologies and techniques similar to the implementation of the third controller interface 544.

The third communication unit 536 can enable external communication to and from the third device 108. For example, the third communication unit 536 can permit the third device 108 to communicate with the first device 102, the second device 106 of FIG. 4, or a combination thereof over the network 104.

The third communication unit 536 can also function as a communication hub allowing the third device 108 to function as part of the network 104 and not limited to be an end point or terminal unit to the network 104. The third communication unit 536 can include active and passive components, such as microelectronics or resistors, for interaction with the network 104.

The third communication unit 536 can include a baseband device or component, a modem, a digital signal processor, or a combination thereof for transmitting, formatting, receiving, detecting, decoding, further processing, or a combination thereof for communication signals. The third communication unit 536 can include one or more portions for processing the voltages, the currents, the digital information, or a combination thereof, such as an analog-to-digital converter, a digital-to-analog converter, a filter, an amplifier, a processor-type circuitry, or a combination thereof. The third communication unit 536 can further include one or more portions for storing information, such as cache or RAM memory, registers, or a combination thereof.

The third communication unit 536 can be coupled with a third inter-device interface 537. The third inter-device interface 537 can be a device or a portion of a device for physically communicating signals with a separate device. The third inter-device interface 537 can communicate by transmitting or receiving signals to or from another device. The third inter-device interface 537 can include one or more instance of the antenna 202 of FIG. 2 for wireless signals, a physical connection and receiver-transmitter for wired signals, or a combination thereof. The third inter-device interface 537 can include an omnidirectional antenna, a wire, an antenna chip, a ceramic antenna, or a combination thereof. The third inter-device interface 537 can further include a port, a wire, a repeater, a connector, a filter, a sensor, or a combination thereof.

The third inter-device interface 537 can detect or respond to a power in electromagnetic waves and provide the detected result to the third communication unit 536 to receive a signal, including the third device transmission 508. The third inter-device interface 537 can provide a path or respond to currents or voltages provided by the third communication unit 536 to transmit a signal, including the third device transmission 510.

The third communication unit 536 can include a third communication interface 550. The third communication interface 550 can be used for communication between the third communication unit 536 and other functional units in the third device 108. The third communication interface 550 can receive information from the other functional units or can transmit information to the other functional units.

The third communication interface 550 can include different implementations depending on which functional units are being interfaced with the third communication unit 536. The third communication interface 550 can be implemented with technologies and techniques similar to the implementation of the third controller interface 544.

The first communication unit 416 can couple with the network 104 to send information to the third device 108 in the first device transmission 408. The third device 108 can receive information in the third communication unit 536 from the first device transmission 408 of the network 104.

The third communication unit 536 can couple with the network 104 to send information to the first device 102 in the third device transmission 510. The first device 102 can receive information in the first communication unit 416 from the third device transmission 510 of the network 104. The computing system 100 can be executed by the first control unit 412, the third control unit 534, or a combination thereof. The group-accommodation device 106 can similarly communicate and interact with the third device 108 using the corresponding units and functions therein.

For illustrative purposes, the third device 108 is shown with the partition having the third user interface 538, the third storage unit 546, the third control unit 534, and the third communication unit 536, although it is understood that the third device 108 can have a different partition. For example, the third software 542 can be partitioned differently such that some or all of its function can be in the third control unit 534 and the third communication unit 536. Also, the third device 108 can include other functional units not shown in FIG. 5 for clarity.

The functional units in the third device 108 can work individually and independently of the other functional units. The third device 108 can work individually and independently from the first device 102, the group-accommodation device 106, the host device 110, and the network 104.

For illustrative purposes, the computing system 100 is described by operation of the first device 102 and the third device 108. It is understood that the first device 102, the group-accommodation device 106, the host device 110, and the third device 108 can operate any of the modules and functions of the computing system 100.

Figure 6:
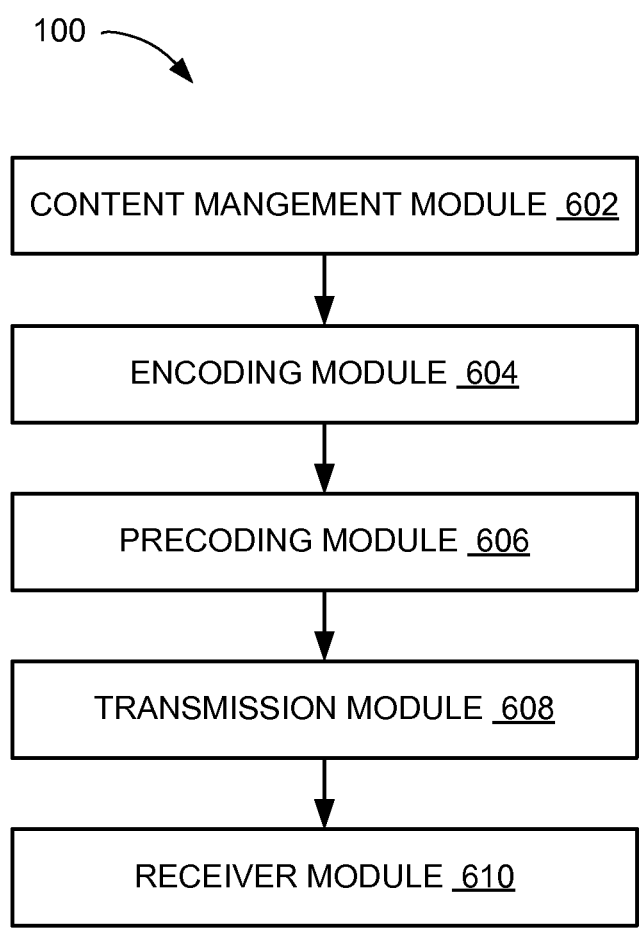
FIG. 6 is a control flow of the computing system.

Referring now to FIG. 6, therein is shown a control flow of the computing system 100. The computing system 100 can include a content management module 602, an encoding module 604, a precoding module 606, a transmission module 608, a receiver module 610, or a combination thereof.

The content management module 602 can be coupled with the encoding module 604, which can be further coupled with the precoding module 606. The precoding module 606 can be further coupled with the transmission module 608, which can be further coupled with the receiver module 610.

The modules can be coupled to each other in a variety of ways. For example, modules can be coupled by having the input of one module connected to the output of another, such as by using wired or wireless connections, the network 104 of FIG. 1, instructional steps, process sequence, or a combination thereof. Also for example, the modules can be coupled either directly with no intervening structure other than connection means between the directly coupled modules, or indirectly with modules or devices other than the connection means between the indirectly coupled modules.

As a more specific example, one or more inputs or outputs of the content management module 602 can be connected to one or more inputs or inputs of the encoding module 604 using conductors or the transmission channel without intervening modules or devices there-between. Also for example, the transmission module 608 can be coupled with the receiver module 610 directly or indirectly, such as through the network 104, the communication channel, such as the first transmission channel 144 of FIG. 1 or the second transmission channel 146 of FIG. 1, the node link 112 of FIG. 1, or a combination thereof. The content management module 602, the encoding module 604, the precoding module 606, the transmission module 608, the receiver module 610, or a combination thereof can be coupled directly or indirectly as exemplified above similar ways.

The computing system 100 can communicate with or using a device, such as by displaying images, recreating sounds, exchanging process steps or instructions, or a combination thereof. The computing system 100 can communicate information between devices. The receiving device can further communicate with the user by displaying images, recreating sounds, exchanging process steps or instructions, or a combination thereof according to the information communicate to the device.

The content management module 602 is configured to coordinate communication of the overall communication content 114 of FIG. 1. The content management module 602 can identify the overall communication content 114 or a portion therein for specific transmission devices. The content management module 602 can further coordinate communication for the blind-joint transmission 110 of FIG. 1. The content management module 602 can coordinate communication for utilizing the overload transmission mode 162 of FIG. 1, including the full-rank transmission mode 148 of FIG. 1. The content management module 602 can coordinate communication for further utilizing the advanced receiver 150 of FIG. 1.

For example, the content management module 602 can identify and manage the content data for utilizing the second device 106 of FIG. 1 and the third device 108 of FIG. 1 to send the overall communication content 114 to the first device 102 of FIG. 1 including the advanced receiver 150. The content management module 602 can identify and communicate the overall communication content 114 or a unique portion therein to each of the second device 106 and the third device 108, enable communication through antennas, enabling the overload transmission mode 162, enabling the blind-joint transmission 110, or a combination thereof.

The content management module 602 can determine the capacity or capability of the first device 102. The content management module 602 can determine the capacity or capability, such as the existence or availability of the advanced receiver 150 or the receiver capacity 154 of FIG. 1, based on information regarding the first device 102 predetermined by the computing system, device identification or device description from the first device 102, or a combination thereof.

The content management module 602 can determine the blind-joint transmission 110, the overload transmission mode 162, or a combination thereof for communicating the overall communication content 114 to the first device 102 based on the first device 102. For example, the content management module 602 can determine the blind-joint transmission 110, the overload transmission mode 162, the full-rank transmission mode 148, or a combination thereof when the first device 102 includes the advanced receiver 150. As a more specific example, the content management module 602 can determine the blind-joint transmission 110, the overload transmission mode 162, the full-rank transmission mode 148, or a combination thereof based on the first device 102 including the advanced receiver 150, regardless of receiver capacity 154 of the first device 102.

The content management module 602 can determine the blind-joint transmission 110, the overload transmission mode 162, or a combination thereof in a variety of ways. For example, the content management module 602 can determine the blind-joint transmission 110, the overload transmission mode 162, or a combination thereof based on setting or communicating a value indicating the blind-joint transmission 110, the overload transmission mode 162, or a combination thereof.

Also for example, the content management module 602 can determine the blind-joint transmission 110, the overload transmission mode 162, or a combination thereof based on determining the first transmission content 116 of FIG. 1, the second transmission content 118 of FIG. 1, or a combination thereof. The content management module 602 can determine the first transmission content 116 for transmitting from the second device 106. The content management module 602 can determine the second transmission content 118 for transmitting from the third device 108.

Continuing with the example, the content management module 602 can determine the first transmission content 116, the second transmission content 118, or a combination thereof as the overall communication content 114, a unique portion therein, or a combination thereof. The content management module 602 can determine the first transmission content 116, the second transmission content 118, or a combination thereof corresponding to transmitting from the second device 106, the third device 108, a combination of antennas therein, or a combination thereof corresponding to the blind-joint transmission 110, the overload transmission mode 162, or a combination thereof.

As a more specific example, the content management module 602 can determine the first transmission content 116 and the second transmission content 118 to each include the overall communication content 114. Also as a more specific example, the content management module 602 can divide the overall communication content 114 according to the transmission capacity 156 of FIG. 1 corresponding to an applicable transmitting device, such as the second device 106 or the third device 108. The content management module 602 can determine the first transmission content 116 and the second transmission content 118 as unique instance or set of divided portions corresponding to the transmission capacity 156 corresponding to the associated transmission device, such as according to number of available antennas or ports on each transmitting device.

The content management module 602 can further identify the overall communication content 114 in entirety or specific portions therein for determining the first transmission content 116, the second transmission content 118, or a combination thereof. The content management module 602 can identify the overall communication content 114 based on communicating the overall communication content 114 in entirety or specific portions therein between devices.

For example, the content management module 602 can communicate the overall communication content 114 in entirety or specific portions therein between transmitting devices, coordinating devices, or a combination thereof. As a more specific example the content management module 602 can communicate between the second device 106, the third device 108, the coordinating device, or a combination thereof. Also as a more specific example, the content management module 602 can communicate the overall communication content 114 in entirety or specific portions therein through the node link 112 of FIG. 1, the network 104, the various communication channels, or a combination thereof.

The content management module 602 can identify and communicate the overall communication content 114 in entirety or specific portions therein based on receiving, sending, coordinating, or a combination thereof for the data. For example, the content management module 602 can identify and communicate the overall communication content 114 in entirety or specific portions therein based on sending, receiving, coordinating, or a combination thereof for the first transmission content 116, the second transmission content 118, or a combination thereof between the second device 106, the third device 108, the coordinating device, or a combination thereof.

As a more specific example, the content management module 602 can include the coordinating device determining the first transmission content 116 and the second transmission content 118 as exemplified above. The content management module 602 can further include the coordinating device communicating the first transmission content 116 to the second device 106 and the second transmission content 118 to the third device 108.

Also as a more specific example, the content management module 602 can include the second device 106 determining the first transmission content 116 and the second transmission content 118 as exemplified above. The content management module 602 can further include the second device 106 communicating the second transmission content 118 to the third device 108.

The content management module 602 can use the first device interface 417 of FIG. 4, the second device interface 437 of FIG. 4, the third device interface 537 of FIG. 5, the first communication unit 416 of FIG. 4, the second communication unit 436 of FIG. 4, the third communication unit 536 of FIG. 5, or a combination thereof to communicate data between devices. The content management module 602 can use the first communication unit 416, the second communication unit 436, the third communication unit 536, the first control unit 412 of FIG. 4, the second control unit 434 of FIG. 4, the third control unit 534 of FIG. 5, or a combination thereof to identify, determine, divide, group, or a combination thereof for the overall communication content 114, a portion therein, the first transmission content 116, the second transmission content 118, or a combination thereof. The content management module 602 can store the overall communication content 114, a portion therein, the first transmission content 116, the second transmission content 118, or a combination thereof in the first communication unit 416, the second communication unit 436, the third communication unit 536, the first storage unit 414 of FIG. 4, the second storage unit 446 of FIG. 4, the third storage unit 546 of FIG. 5, or a combination thereof.

After coordinate communication of the overall communication content 114, the control flow can pass to the encoding module 604. The control flow can pass through a variety of ways. For example, control flow can pass by having processing results of one module passed to another module, such as by passing the overall communication content 114, a portion therein, the first transmission content 116, the second transmission content 118, or a combination thereof from the content management module 602 to the encoding module 604, by storing the processing results at a location known and accessible to the other module, such as by storing the overall communication content 114, a portion therein, the first transmission content 116, the second transmission content 118, or a combination thereof at a storage location known and accessible to the encoding module 604, by notifying the other module, such as by using a flag, an interrupt, a status signal, or a combination for the encoding module 604, or a combination of processes thereof.

The encoding module 604 is configured to process and prepare the content data for communication between devices. The encoding module 604 can process and prepare including encoding the content data. The encoding module 604 can encode the overall communication content 114, a portion therein, the first transmission content 116, the second transmission content 118, or a combination thereof. The encoding module 604 can encode the content data to generate the first encoded set 122 of FIG. 1, the second encoded set 124 of FIG. 1, or a combination thereof.

For example, the encoding module 604 can generate the first encoded set 122 corresponding to the overall communication content 114 or the portion therein according to the first transmission content 116. The encoding module 604 can generate the first encoded set 122 corresponding to the second device 106. The encoding module 604 can further generate the first encoded set 122 at or using the second device 106.

Also for example, the encoding module 604 can generate the second encoded set 124 corresponding to the overall communication content 114 or the portion therein according to the second transmission content 118. The encoding module 604 can generate the second encoded set 124 corresponding to the third device 108. The encoding module 604 can further generate the second encoded set 124 at or using the third device 108.

The encoding module 604 can generate the first encoded set 122 based on a portion of the overall communication content 114 corresponding to the second device 106 for communicating the first encoded set 122 coordinated with the second encoded set 124 based on a different portion of the overall communication content 114 corresponding to the third device 108. The encoding module 604 can generate the second encoded set 124 based on the different portion of the overall communication content 114 for the coordinated communication.

As a more specific example, the encoding module 604 can generate the overall encoded message 120 of FIG. 1 corresponding to the overall communication content 114. As exemplified in FIGS. 1 and 3, the encoding module 604 can generate the overall encoded message 120 including the first code word 126 of FIG. 1, the second code word 128 of FIG. 1, the third code word 130 of FIG. 1, and the fourth code word 132 of FIG. 1.

Continuing with the example, the encoding module 604 can generate the first encoded set 122 and the second encoded set 124 to each include the overall encoded message 120. The encoding module 604 can further generate the first encoded set 122 and the second encoded set 124 to each include non-overlapping portions of the overall encoded message 120 or each corresponding to the first transmission content 116 or the second transmission content 118 including unique portions of the overall communication content 114. As exemplified in FIGS. 1 and 3, the encoding module 604 can generate the first encoded set 122 to include the first code word 126 and the second code word 128, and generate the second encoded set 124 to include the third code word 130 and the fourth code word 132.

The encoding module 604 can generate the first encoded set 122 and the second encoded set 124 for simultaneous or concurrent transmission. For example, the encoding module 604 can generate the first encoded set 122 for transmission from the second device 106 simultaneously or concurrent with transmitting the second encoded set 124 from the third device 108. The encoding module 604 can generate the second encoded set 124 for transmission from the third device 108 simultaneously or concurrent with transmitting the first encoded set 122 from the second device 106.

The encoding module 604 can encode based on a method or a process predetermined by the computing system 100, a communication standard, or a combination thereof. For example, the encoding module 604 can encode based on turbo-coding scheme or polar-coding scheme. As a more specific example, the encoding module 604 can add information, remove information, format the content data, rearrange the content data, or a combination thereof, such as for error correcting process, error detecting process, communication protocol, or a combination thereof.

The encoding module 604 can use the first communication unit 416, the second communication unit 436, the third communication unit 536, the first control unit 412, the second control unit 434, the third control unit 534, or a combination thereof to encode the content data and generate the encoded result. The encoding module 604 can store the encoded result in the first communication unit 416, the second communication unit 436, the third communication unit 536, the first storage unit 414, the second storage unit 446, the third storage unit 546, or a combination thereof.

After encoding the content data and generating the encoded result, the control flow can be passed from the encoding module 604 to the precoding module 606. The control flow can pass similarly as described above between the content management module 602 and the encoding module 604 but using processing results of the encoding module 604, such as the overall encoded message 120, the first encoded set 122, the second encoded set 124, or a combination thereof.

The precoding module 606 is configured to further process and prepare the content data for communication between devices. The precoding module 606 can implement the precoding process for the encoding results. For example, the precoding module 606 can determine the overall pre-coding mechanism 134 of FIG. 1, the first pre-coding mechanism 136 of FIG. 1, the second pre-coding mechanism 138 of FIG. 1, or a combination thereof based on the first encoded set 122, the second encoded set 124, or a combination thereof including the overall encoded message 120 or a portion thereof.

The precoding module 606 can determine the first pre-coding mechanism 136 associated with the first encoded set 122. The precoding module 606 can determine the second pre-coding mechanism 138 associated with the second encoded set 124.

The precoding module 606 can determine the overall pre-coding mechanism 134, the first pre-coding mechanism 136, the second pre-coding mechanism 138, or a combination thereof for communicating the overall communication content 114 simultaneously or concurrently using multiple devices, multiple antennas therein, or a combination thereof. The precoding module 606 can determine the overall pre-coding mechanism 134, the first pre-coding mechanism 136, the second pre-coding mechanism 138, or a combination thereof for communicating the overall communication content 114 using the overload transmission mode 162, the full-rank transmission mode 148, the blind-joint transmission 110, or a combination thereof.

The precoding module 606 can determine the first pre-coding mechanism 136 corresponding to the first encoded set 122, the second pre-coding mechanism 138 corresponding to the second encoded set 124, or a combination thereof. For example, the precoding module 606 can determine the first pre-coding mechanism 136 and the second pre-coding mechanism 138 as including the overall pre-coding mechanism 134 or a portion therein when the first encoded set 122 and the second encoded set 124 includes the overall encoded message 120 in its entirety, directly associated with the entirety of the overall communication content 114.

Also for example, the precoding module 606 can determine the first pre-coding mechanism 136 and the second pre-coding mechanism 138 as including unique and non-overlapping portions of the overall pre-coding mechanism 134. The precoding module 606 can determine the first pre-coding mechanism 136 as the first transmission portion 302 of FIG. 3 within the overall pre-coding mechanism 134, the second pre-coding mechanism 138 as the second transmission portion 304 of FIG. 3 within the overall pre-coding mechanism 134, or a combination thereof.

Also for example, the precoding module 606 can determine the first pre-coding mechanism 136 using only or directly from the first encoded set 122 and the second pre-coding mechanism 138 using only or directly from the second encoded set 124. The precoding module 606 can determine the first pre-coding mechanism 136 and the second pre-coding mechanism 138 based on or directly associated with unique portions of the content when the first encoded set 122 and the second encoded set 124 each includes unique portions of the overall encoded message 120, directly associated with unique portions within the overall communication content 114.

The precoding module 606 can determine the first precoding mechanism 136 and the second pre-coding mechanism 138 based on the rotating pattern 326 of FIG. 3. The precoding module 606 can determine the first pre-coding mechanism 136 and the second pre-coding mechanism 138 without utilizing the transmitter channel-information 160 of FIG. 1. The computing system 100 can utilize the blind joint transmission 110 based on coordinating transmissions to a receiving device, such as the first device 102, from multiple transmitting devices, such as the second device 106 and the third device 108, without utilizing the channel estimation 158 of FIG. 1 or the transmitter channel-information 160.

The precoding module 606 can determine the first precoding mechanism 136 and the second pre-coding mechanism 138 by according to the transmission capacity 156 overall or for each transmission device, the length or size of the first transmission content 116 or the second transmission content 118, or a combination thereof. For example, the precoding module 606 can determine the overall pre-coding mechanism 134 based on rotating portions of the overall encoded message 120 according to the rotating pattern 326 across transmitting devices, such as the second device 106 or the third device 108, across instances of the antenna 202 of FIG. 2, across transmission slots, or a combination thereof.

As a more specific example, the precoding module 606 can determine the overall pre-coding mechanism 134 by assigning the first code word 126, the second code word 128, the third code word 130, and the fourth code word 132 to the first antenna slot 310 of FIG. 3, the second antenna slot 312 of FIG. 3, the third antenna slot 314 of FIG. 3, and the fourth antenna slot 316 respectively for the first transmission slot 318 of FIG. 3. The precoding module 606 can further determine the overall pre-coding mechanism 134 by assigning each of the code words to a different instance of the antenna slot for the second transmission slot 320 of FIG. 3, the third transmission slot 322 of FIG. 3, and the fourth transmission slot 324 of FIG. 3 according to the rotating pattern 326, such as the parallel diagonal pattern 328 of FIG. 3 or the alternating diagonal pattern 330 of FIG. 3.

Continuing with the example, the precoding module 606 can determine the overall pre-coding mechanism 134 by assigning the portions of the overall pre-coding mechanism 134 based on repeating the rotating pattern 326. The precoding module 606 can determine the first pre-coding mechanism 136 as the overall pre-coding mechanism 134 in entirety or the first transmission portion 302 therein as exemplified above. The precoding module 606 can determine the second pre-coding mechanism 138 as the overall pre-coding mechanism 134 in entirety or the second transmission portion 304 therein as exemplified above.

Also for example, the precoding module 606 can determine the first pre-coding mechanism 136 and the second pre-coding mechanism 138 based on rotating portions of the first transmission portion 302, the second transmission portion 304, or a combination thereof with respect to instances of the antenna 202 for each of the transmitting devices, across transmission slots, or a combination thereof. The precoding module 606 can determine the first pre-coding mechanism 136 and the second pre-coding mechanism 138 each corresponding to the first encoded set 122 and the second encoded set 124 associated with non-overlapping and unique portions of the overall communication content 114. The precoding module 606 can determine the first pre-coding mechanism 136 and the second pre-coding mechanism 138 according to the size, length, quantity, or availability of the first encoded set 122, the second encoded set 124, the transmission capacity 156 associated with each transmitting device, or a combination thereof.

As a more specific example, the first encoded set 122 can include the first code word 126 and the second code word 128 for the second device 106 and the second encoded set 124 can include the third code word 130 and the fourth code word 132 for the third device 108. The precoding module 606 can determine the first pre-coding mechanism 136 based on assigning the first code word 126 and the second code word 128 across transmission slots and antenna assignments based on the rotating pattern 326, such as the parallel diagonal pattern 328 or the alternating diagonal pattern 330.

Continuing with the example, the precoding module 606 can similarly determine the second pre-coding mechanism 138 based on assigning the third code word 130 and the fourth code word 132 across transmission slots and antenna assignments based on the rotating pattern 326. The starting point or the coordination for the rotating pattern 326 of the second pre-coding mechanism 138 can be offset or complementary with the first pre-coding mechanism 136.

The rotating pattern 326 can be based on rotating the given sets of data or code words for a specific transmitting device across the available antennas within each instance of the transmitting device. The precoding module 606 can utilize the rotating pattern 326 with the first encoded set 122 corresponding to a portion of the overall encoded message 120 for the second device 106 and the instances of the antenna 202 therein to determine the first pre-coding mechanism 136. The precoding module 606 can further utilize the rotating pattern 326 with the second encoded set 124 corresponding to a different portion of the overall encoded message 120 for the third device 108 and the instances of the antenna 202 therein to determine the second pre-coding mechanism 138.

The precoding module 606 can also utilize the rotating pattern 326 with the first encoded set 122 and the second encoded set 124 corresponding to the entirety of the overall encoded message 120 for all instances of the transmitting devices, such as the second device 106 and the third device 108, and the instances of the antenna 202 therein to determine the overall pre-coding mechanism 134. The rotating pattern 326 can be based on rotating the overall set of data or code words across all available instances of the antenna 202 across all available transmitting device. The precoding module 606 can determine the first pre-coding mechanism 136 and the second pre-coding mechanism 138 each as unique and non-overlapping portions of the overall pre-coding mechanism 134.

The precoding module 606 can determine the first pre-coding mechanism 136, the second pre-coding mechanism 138, or a combination thereof without utilizing the transmitter channel-information 160. The precoding module 606 can determine the first pre-coding mechanism 136, the second pre-coding mechanism 138, or a combination thereof based on the rotating pattern 326 instead of the transmitter channel-information 160.

It has been discovered that the first pre-coding mechanism 136 and the second pre-coding mechanism 138 utilizing the rotating pattern 326 instead of the transmitter channel-information 160 provides increased efficiency and resource management. The first pre-coding mechanism 136 and the second pre-coding mechanism 138 utilizing the rotating pattern 326 can utilize antennas available across multiple transmitters without being limited by the receiver capacity 154. The blind-joint transmission 110 can utilize all available resources regardless of the receiver capacity 154 and without being limited to one transmitter.

The precoding module 606 can determine the first pre-coding mechanism 136, the second pre-coding mechanism 138, or a combination thereof based on coordinating through node link 112 for coordinating the first pre-coding mechanism 136 with the second pre-coding mechanism 138 across the transmitting devices. The precoding module 606 can communicate the determination of the blind-joint transmission 110 as described above. The precoding module 606 can further communicate a starting point, an offset value, a format or an initial setting, an antenna assignment or identification, or a combination thereof for each of the transmitting devices.

For example, the precoding module 606 can select a transmitting device, an antenna therein, or a combination thereof for assigning specific instance of the antenna slot for the overall pre-coding mechanism 134. The precoding module 606 can communicate information to the second device 106 to designate the first antenna slot 310 and the second antenna slot 312 of the overall pre-coding mechanism 134 as corresponding to instances of the antenna 202 on the second device 106. The precoding module 606 can similarly assign the third antenna slot 314 and the fourth antenna slot 316 as the instances of the antenna 202 on the third device 108.

Also for example, the precoding module 606 can communicate a setting, a configuration, an offset value, a starting point, or a combination thereof predetermined by the computing system 100 for each of the transmitting devices. The communicated setting, configuration, offset value, starting point, or a combination thereof can correspond to the relationship or a correspondence between a specific antenna on a transmitting device and an instance of the antenna slot of the overall pre-coding mechanism 134.

The precoding module 606 can utilize all available instances of the antenna 202 across transmission devices within transmitting range relative to the first device 102 for the full-rank transmission mode 148. The precoding module 606 can control the instances of the antenna 202 or a combined quantity thereof to be less than all available instances for the overload transmission mode 162 not reaching the full-rank transmission mode 148.

The precoding module 606 can coordinate the antenna assignments corresponding to the transmission mode similarly as described above. The precoding module 606 can determine the first pre-coding mechanism 136, the second pre-coding mechanism 138, or a combination thereof for coordinating the first pre-coding mechanism 136 with the second pre-coding mechanism 138 for full-rank transmission mode 148 utilizing the second device 106 and the third device 108 as described above.

As a comprehensive example, the second device 106 can identify or receive a portion of the overall communication content 114 as the first transmission content 116 with the content management module 602. The second device 106 can use the encoding module 604 to generate the first encoded set 122 based on the portion of the overall communication content 114 for the first pre-coding mechanism 136 corresponding to a portion within the overall pre-coding mechanism 134 as determined by the precoding module 606.

Continuing with the example, the third device 108 can identify or receive a different portion of the overall communication content 114 as the second transmission content 118 with the content management module 602. The third device 108 can use the encoding module 604 to generate the second encoded set 124 based on the different portion of the overall communication content 114 for the second pre-coding mechanism 138 corresponding to a different portion within the overall pre-coding mechanism 134 as determined by the precoding module 606.

Continuing with the example, the second device 106 and the third device 108 can encode and determine without coordinating with each other based on receiving unique portions of the overall communication content 114. The computing system 100 can use the first encoded set 122 with the first pre-coding mechanism 136 and the second encoded set 124 with the second pre-coding mechanism 138 for communicating the overall communication content 114 with the blind joint transmission 110 utilizing simultaneous transmissions from multiple devices without utilizing global channel information at the transmitters.

Continuing with the example, the overall pre-coding mechanism 134 can be represented as $$\cdot \frac{1}{2}\begin{bmatrix} 1 & 1 & 1 & -1 \\ 1 & 1 & -1 & 1 \\ 1 & -1 & 1 & 1 \\ -1 & 1 & 1 & 1 \end{bmatrix}, \text{ or } \cdot \frac{1}{2}\begin{bmatrix} -1 & 1 & 1 & 1 \\ 1 & -1 & 1 & 1 \\ 1 & 1 & -1 & 1 \\ 1 & 1 & 1 & -1 \end{bmatrix},$$

based on the rotating pattern 326. The first pre-coding mechanism 136 can include the first two columns or rows of the overall pre-coding mechanism 134. The second pre-coding mechanism 138 can include the last two columns or rows of the overall pre-coding mechanism 134. The first pre-coding mechanism 136 can further include the overall pre-coding mechanism 134 in entirety. The second first pre-coding mechanism 138 can further include the overall pre-coding mechanism 134 with the last two rows or columns rearranged to become the first two rows or columns.

Continuing with the example, each device can be for transmitting unique and non-overlapping portions of the overall communication content 114 over multiple transmission slots. The computing system 100 can include the overall communication content 114 or a complete set thereof communicated for each instance of the transmission slot across multiple devices and multiple antennas.

Also as a comprehensive example, the second device 106, the third device 108, or a combination thereof can identify or receive the overall communication content 114 in entirety as the first transmission content 116, the second transmission content 118, or a combination thereof with the content management module 602. The second device 106, the third device 108, or a combination thereof can use the encoding module 604 to generate the first encoded set 122, the second encoded set 124, or a combination thereof including the overall encoded message 120 based on the entirety of the overall communication content 114.

Continuing with the example, the second device 106, the third device 108, or a combination thereof can generate the first encoded set 122, the second encoded set 124, or a combination thereof from the overall communication content 114 for an instance of the transmission slot for the overall pre-coding mechanism 134 as determined by the precoding module 606. The second device 106 and the third device 108 can encode and determine based on coordinating between the devices as described above.

Continuing with the example, the second device 106 and the third device 108 can determine the corresponding pre-coding mechanism for transmitting the overall communication content 114 in entirety from each device over multiple transmission slots. The second device 106 and the third device 108 can determine the corresponding pre-coding mechanism for communicating the overall communication content 114 with the blind-joint transmission 110 utilizing simultaneous transmissions from multiple devices without utilizing global channel information at the transmitters.

Continuing with the example, the first pre-coding mechanism 136, the second pre-coding mechanism 138, or a combination thereof can each be represented as $$`\frac{1}{2}\begin{bmatrix} 1 & -1 \\ -1 & 1 \end{bmatrix}`, \text{ or } `\frac{1}{2}\begin{bmatrix} -1 & 1 \\ 1 & -1 \end{bmatrix}`,$$

based on the rotating pattern 326. The computing system 100 can include the overall communication content 114 or a complete set thereof communicated for each instance of the transmission slot across multiple devices and multiple antennas.

It has been discovered that the overall pre-coding mechanism 134 based on the rotating pattern 326 provides increased robustness and communication rate. The overall pre-coding mechanism 134 based on the rotating pattern 326 can eliminate the requirement for the transmitter channel-information 160 during the precoding process, enabling the joint communication for open-loop communication schemes. The joint communication can increase the amount of simultaneously transmitted data, increasing the transmission speed.

It has further been discovered that the blind-joint transmission 110 provides increased efficiency and resource management. The blind-joint transmission 110 can utilize antennas available across multiple transmitters without being limited by the receiver capacity 154. The blind joint transmission 110 can utilize all available resources regardless of the receiver capacity 154 and without being limited to one transmitter.

It has further been discovered that the first pre-coding mechanism 136 and the second pre-coding mechanism 138 each corresponding to the overall encoded message 120 provide increased overall throughput while reducing processing errors. The first pre-coding mechanism 136 and the second pre-coding mechanism 138 each corresponding to the overall encoded message 120 can use the rotating pattern 326 across all antennas and all portions of the content to eliminate the undesired affect from the communication channel.

It has further been discovered that the first pre-coding mechanism 136 and the second pre-coding mechanism 138 each corresponding to different unique portions within the overall encoded message 120 provide reduced processing complexity while increasing the overall throughput. The first pre-coding mechanism 136 and the second pre-coding mechanism 138 each corresponding to different unique portions can reduce the need to duplicate in encoding the content at each transmitter.

The precoding module 606 can use the first communication unit 416, the second communication unit 436, the third communication unit 536, the first control unit 412, the second control unit 434, the third control unit 534, or a combination thereof to determine the pre-coding mechanism, such as the first pre-coding mechanism 136, the second pre-coding mechanism 138, the overall pre-coding mechanism 134, or a combination thereof. The precoding module 606 can store the pre-coding mechanism in the first communication unit 416, the second communication unit 436, the third communication unit 536, the first storage unit 414, the second storage unit 446, the third storage unit 546, or a combination thereof.

After the determining the pre-coding mechanism, the control flow can be passed from the precoding module 606 to the transmission module 608. The control flow can pass similarly as described above between the content management module 602 and the encoding module 604 but using processing results of the precoding module 606, such as the first pre-coding mechanism 136, the second pre-coding mechanism 138, the overall pre-coding mechanism 134, or a combination thereof.

The transmission module 608 and the receiver module 610 are configured to communicate the intended content between devices. The transmission module 608 can be configured to send the overall communication content 114 for the blind-joint transmission 110. For example, the transmission module 608 can transmit the first transmitter signal 140 of FIG. 1 and the second transmitter signal 142 of FIG. 1 from the second device 106 and the third device 108 to the first device 102.

The transmission module 608 can communicate by transmitting the first transmitter signal 140 based on the first encoded set 122 and the first pre-coding mechanism 136. The transmission module 608 can further communicate the second transmitter signal 142 based on the second encoded set 124 and the second pre-coding mechanism 138. The transmission module 608 can communicate by transmitting the first transmitter signal 140 and the second transmitter signal 142 simultaneously or concurrently from the second device 106 and the third device 108.

The transmission module 608 can transmit the first transmission content 116 and the second transmission content 118 through the first transmitter signal 140 and the second transmitter signal 142. The transmission module 608 can transmit the first transmission content 116 and the second transmission content 118 including different or unique data. For example, the transmission module 608 can transmit the first transmission content 116 and the second transmission content 118 each representing unique and non-overlapping portions of the overall communication content 114 instead of transmitting redundant or identical information through the first transmitter signal 140 and the second transmitter signal 142.

The transmission module 608 can transmit using the first device interface 417, the second device interface 437, the third device interface 537, the first communication unit 416, the second communication unit 436, the third communication unit 536, or a combination thereof. The transmission module 608 can transmit by generating electromagnetic signals, such as based on manipulating voltage, current, power, or a combination thereof across multiple instances of the antenna 202.

The receiver module 610 is configured to receive the receiver signal 152 of FIG. 1 corresponding to the first transmitter signal 140 and the second transmitter signal 142, and recover the overall communication content 114. The receiver module 610 can recover the overall communication content 114 using the advanced receiver 150 at the first device 102.

The advanced receiver 150 can utilize a processing mechanism configured to process instances the data layers 204 of FIG. 2 and quantity of the layer count 206 of FIG. 2 exceeding the receiver capacity 154. The advanced receiver 150 can utilize the processing mechanism including interference-aware processing mechanism.

For example, the advanced receiver 150 can implement interference-aware detection or interference-aware decoding to recognize information communicated in excess of the receiver capacity 154. The advanced receiver 150 can recognize the additional information as being a part of the overall communication content 114 and not the interference signal.

Figure 7:
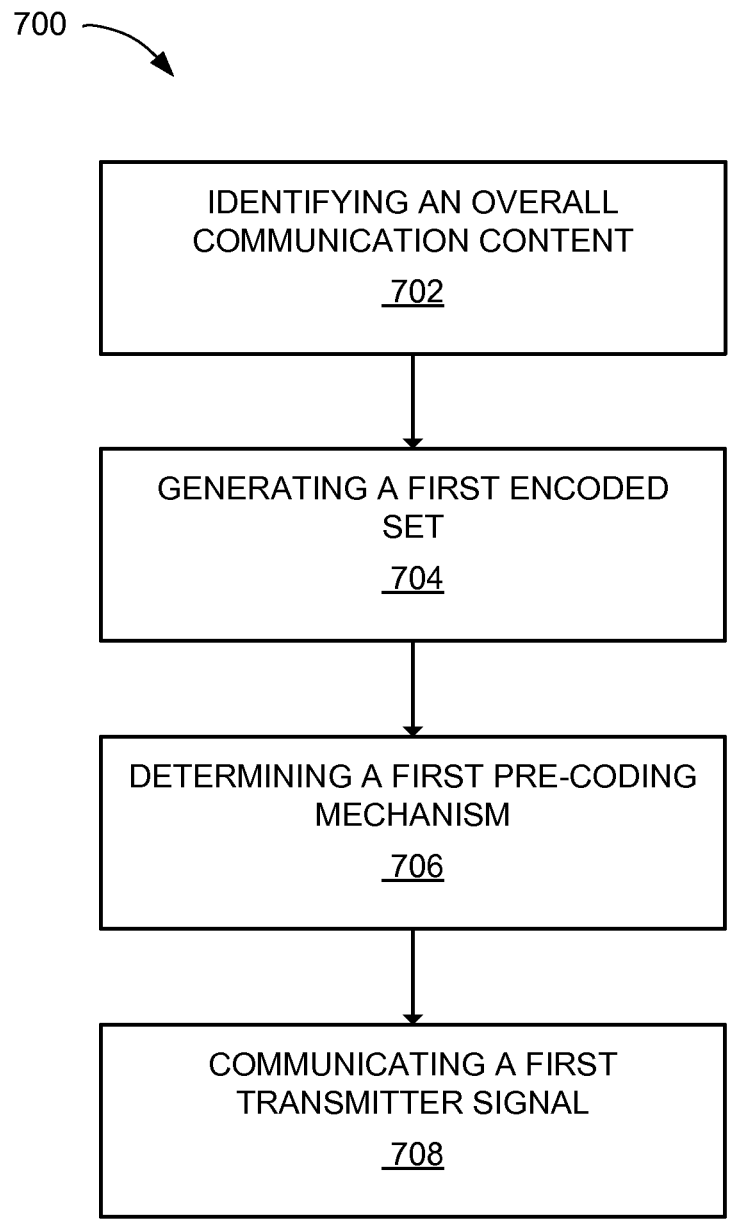
FIG. 7 is a flow chart of a method of operation of a computing system in a further embodiment.

Referring now to FIG. 7, therein is shown a flow chart 700 of a method of operation of a computing system in a further embodiment. The method 700 includes: identifying an overall communication content or a portion therein for blind-joint transmission with a second device for utilizing the second device and a third device to send the overall communication content to a first device in a block 702; generating a first encoded set corresponding to the overall communication content or the portion therein for communicating the overall communication content along with a second encoded set for the third device in a block 704; determining with a communication unit a first pre-coding mechanism associated with the first encoded set for communicating the overall communication content with overload transmission mode including a second pre-coding mechanism for the third device in a block 706; and communicating a first transmitter signal based on the first encoded set and the first pre-coding mechanism for communicating the first transmitter signal concurrently with a second transmitter signal from the third device in a block 708.

The modules described in this application can be hardware implementation or hardware accelerators, including passive circuitry, active circuitry, or both, in the first communication unit 416 of FIG. 4, the second communication unit 436 of FIG. 4, the third communication unit 536 of FIG. 5, the first control unit 412 of FIG. 4, the second control unit 438 of FIG. 4, the third control unit 534 of FIG. 5, or a combination thereof. The modules can also be hardware implementation or hardware accelerators, including passive circuitry, active circuitry, or both, within the first device 102 of FIG. 1, the second device 106 of FIG. 1, the third device 108 of FIG. 1, or a combination thereof but outside of the first communication unit 416, the second communication unit 436, the third communication unit 536, the first control unit 412, the second control unit 434, the third control unit 534, or a combination thereof.

The computing system 100 of FIG. 1 has been described with module functions or order as an example. The computing system 100 can partition the modules differently or order the modules differently. For example, the encoding module 604 and the precoding module 606 can be combined. Also for example, the content management module 602 can be implemented with the second device 106, the third device 108, the node link 112 of FIG. 1, the coordinating device, or a combination thereof, or include sub-module for obtaining availability information and sub-module for determining or designating content for transmission at each device.

For illustrative purposes, the various modules have been described as being specific to the first device 102, the second device 106, the third device 108, or a combination thereof. However, it is understood that the modules can be distributed differently. For example, the various modules can be implemented in a different device, or the functionalities of the modules can be distributed across multiple devices. Also as an example, the various modules can be stored in a non-transitory memory medium.

As a more specific example, one or more modules described above can be stored in the non-transitory memory medium for distribution to a different system, a different device, a different user, or a combination thereof, for manufacturing, or a combination thereof. Also as a more specific example, the modules described above can be implemented or stored using a single hardware unit, such as a chip or a processor, or across multiple hardware units.

The modules described in this application can be stored in the non-transitory computer readable medium. The first communication unit 416, the second communication unit 436, the third communication unit 536, the first storage unit 414 of FIG. 4, the second storage unit 446 of FIG. 4, the third storage unit 546 of FIG. 5, or a combination thereof can represent the non-transitory computer readable medium. The first communication unit 416, the second communication unit 436, the third communication unit 516, the first storage unit 414, the second storage unit 446, the third storage unit 546, or a combination thereof, or a portion therein can be removable from the first device 102, the second device 106, the third device 108, or a combination thereof. Examples of the non-transitory computer readable medium can be a non-volatile memory card or stick, an external hard disk drive, a tape cassette, or an optical disk.

The physical transformation of pre-coding mechanism, such as the overall pre-coding mechanism 134 of FIG. 1, the first pre-coding mechanism 136, the second pre-coding mechanism 138, or a combination thereof results in the movement in the physical world, such as content displayed or recreated for the user on the first device 102 from processing the overall communication content 114 of FIG. 1 communicated using the pre-coding mechanisms. The content reproduced on the first device 102, such as navigation information or voice signal of a caller, can influence the user's movement, such as following the navigation information or replying back to the caller. Movement in the physical world results in changes to the geographic location of the first device 102, which can be fed back into the computing system 100 and influence the transmitting devices and corresponding available resources.

The resulting method, process, apparatus, device, product, and/or system is straightforward, cost-effective, uncomplicated, highly versatile, accurate, sensitive, and effective, and can be implemented by adapting known components for ready, efficient, and economical manufacturing, application, and utilization. Another important aspect of an embodiment as described above is that it valuably supports and services the historical trend of reducing costs, simplifying systems, and increasing performance.

These and other valuable aspects of an embodiment as described above consequently further the state of the technology to at least the next level.

While the embodiments have been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters set forth herein or shown in the accompanying drawings are to be interpreted in an illustrative and non-limiting sense.

What is claimed is:

1. A computing system comprising:
 a communication unit configured to:
  identify a first portion of an overall communication content for transmission of the first portion from a first transmitter over a first channel to a receiver device, wherein the overall communication content further includes a second portion for transmission from a second transmitter to the receiving device over a second channel, generate a first encoded set corresponding to the first portion of the overall communication content, determine a first pre-coding mechanism associated with the first encoded set, an inter-device interface, coupled to the communication unit, configured to communicate a first transmitter signal based on the first encoded set and the first pre-coding mechanism wherein the first transmitter signal is coordinated with a second transmitter signal that is based on a second encoded set and a second pre-coding mechanism; and wherein the first pre-coding mechanism and the second pre-coding mechanism coordinate the transmission of the first transmitter signal and the second transmitter signal for an open-loop system utilizing a blind-joint transmission without receiving feedback information from the receiving device, wherein the feedback information represents channel state information regarding the first channel and the second channel.

2. The system as claimed in claim 1 wherein the communication unit is configured to determine the first pre-coding mechanism without utilizing transmitter channel-information.

3. The system as claimed in claim 1 wherein the communication unit is configured to determine the first pre-coding mechanism corresponding to the first portion within the overall communication content.

4. The system as claimed in claim 1 wherein the communication unit is configured to determine the first pre-coding mechanism based on overall pre-coding mechanism corresponding to entirety of the overall communication content.

5. The system as claimed in claim 1 wherein the communication unit is configured to determine the first pre-coding mechanism based on coordinating through node link for coordinating the first pre-coding mechanism with the second pre-coding mechanism across the first transmitter and the second transmitter.

6. The system as claimed in claim 1 wherein the communication unit is configured to:

determine the blind-joint transmission for communicating the overall communication content to the receiving device including an advanced receiver, and determine the first pre-coding mechanism for coordinating the first pre-coding mechanism with the second pre-coding mechanism for full-rank transmission mode utilizing the first transmitter and the second transmitter.

7. The system as claimed in claim 6 wherein the communication unit is configured to determine the first pre-coding mechanism without utilizing transmitter channel-information based on a rotating pattern of an overall pre-coding mechanism for representing the first pre-coding mechanism and the second pre-coding mechanism.

8. The system as claimed in claim 6 wherein the communication unit is configured to determine the full-rank transmission mode for the blind-joint transmission for communicating the overall communication content based on the advanced receiver regardless of receiver capacity of the receiving device.

9. The system as claimed in claim 6 wherein:

the inter-device interface is configured to identify the overall communication content in entirety through node link; and the communication unit is configured to generate the first encoded set from the overall communication content for a transmission slot according to an overall pre-coding mechanism.

10. The system as claimed in claim 6 wherein:

the inter-device interface is configured to receive only the first portion of the overall communication content through node link; and the communication unit is configured to generate the first encoded set based on the first portion of the overall communication content according to the first pre-coding mechanism corresponding to a first pre-coding portion within an overall pre-coding mechanism for coordinating with a second pre-coding portion within the overall pre-coding mechanism.

11. A method of operation of a computing system comprising:

identifying a first portion of an overall communication content for transmission of the first portion from a first transmitter over a first channel to a receiver device, wherein the overall communication content further includes a second portion for transmission from a second transmitter to the receiving device over a second channel;

generating a first encoded set corresponding to the first portion of the overall communication content;

determining with a communication unit a first pre-coding mechanism associated with the first encoded set;

communicating a first transmitter signal based on the first encoded set and the first pre-coding mechanism wherein the first transmitter signal is coordinated with a second transmitter signal that is based on a second encoded set and a second pre-coding mechanism; and wherein the first pre-coding mechanism and the second pre-coding mechanism coordinate the transmission of the first transmitter signal and the second transmitter signal for an open-loop system utilizing a blind-joint transmission without receiving feedback information from the receiving device, wherein the feedback information represents channel state information regarding the first channel and the second channel.

12. The method as claimed in claim 11 wherein determining the first pre-coding mechanism includes determining the first pre-coding mechanism without utilizing transmitter channel-information.

13. The method as claimed in claim 11 wherein determining the first pre-coding mechanism includes determining the first pre-coding mechanism corresponding to the first portion within the overall communication content.

14. The method as claimed in claim 11 wherein determining the first pre-coding mechanism includes determining the first pre-coding mechanism based on overall pre-coding mechanism corresponding to entirety of the overall communication content.

15. The method as claimed in claim 11 wherein determining the first pre-coding mechanism includes determining the first pre-coding mechanism based on coordinating through node link for coordinating the first pre-coding mechanism with the second pre-coding mechanism across the first transmitter and the second transmitter.

16. A non-transitory computer readable medium including instructions for a computing system comprising:

identifying a first portion of an overall communication content for transmission of the first portion from a first transmitter over a first channel to a receiver device, wherein the overall communication content further includes a second portion for transmission from a second transmitter to the receiving device over a second channel;

generating a first encoded set corresponding to the first portion of the overall communication content;

determining a first pre-coding mechanism associated with the first encoded set;

communicating a first transmitter signal based on the first encoded set and the first pre-coding mechanism wherein the first transmitter signal is coordinated with a second transmitter signal that is based on a second encoded set and a second pre-coding mechanism; and wherein the first pre-coding mechanism and the second pre-coding mechanism coordinate the transmission of the first transmitter signal and the second transmitter signal for an open-loop system utilizing a blind joint transmission without receiving feedback information from the receiving, device wherein the feedback information represents channel state information regarding the first channel and the second channel.

17. The non-transitory computer readable medium as claimed in claim 16 wherein determining the first pre-coding mechanism includes determining the first pre-coding mechanism without utilizing transmitter channel-information.

18. The non-transitory computer readable medium as claimed in claim 16 wherein determining the first pre-coding mechanism includes determining the first pre-coding mechanism corresponding to the first portion within the overall communication content.

19. The non-transitory computer readable medium as claimed in claim 16 wherein determining the first pre-coding mechanism includes determining the first pre-coding mechanism based on overall pre-coding mechanism corresponding to entirety of the overall communication content.

20. The non-transitory computer readable medium as claimed in claim 16 wherein determining the first pre-coding mechanism includes determining the first pre-coding mechanism based on coordinating through node link for coordinating the first pre-coding mechanism with the second pre-coding mechanism across the first transmitter and the second transmitter.

* * * * *